United States Patent
Matsunaga et al.

(10) Patent No.: US 6,197,168 B1
(45) Date of Patent: Mar. 6, 2001

(54) ELECTROCHEMICAL STAIN PREVENTION APPARATUS OF SUBMERGED STRUCTURE AND PROCESS FOR PRODUCING SUBMERGED STRUCTURE USED IN THIS APPARATUS

(75) Inventors: Tadashi Matsunaga, 4-20-15, Hon-cho, Koganei-shi, Tokyo 184-0004; Tsuruo Nakayama, Soka; Hitoshi Wake, Soka; Kin-ichi Ozawa, Soka; Noriyuki Nakamura, Koganei; Nobuyuki Murakami, Chuo-ku; Hiromichi Takahashi, Soka; Toshihiro Takimoto, Soka; Hideo Kadoi, Soka, all of (JP)

(73) Assignees: Pentel Kabushiki Kaisha; Tadashi Matsunaga, both of (JP)

( * ) Notice: Subject to any disclaimer, the term of this patent is extended or adjusted under 35 U.S.C. 154(b) by 0 days.

(21) Appl. No.: 09/426,658

(22) Filed: Oct. 25, 1999

Related U.S. Application Data

(63) Continuation of application No. PCT/JP98/03484, filed on Aug. 26, 1998.

(30) Foreign Application Priority Data

| Feb. 26, 1998 | (JP) | 10-062159 |
| Mar. 16, 1998 | (JP) | 10-084953 |
| Apr. 30, 1998 | (JP) | 10-136039 |
| May 28, 1998 | (JP) | 10-164229 |
| Jun. 26, 1998 | (JP) | 10-196677 |

(51) Int. Cl.[7] .................................................. C23F 13/00
(52) U.S. Cl. .............................. 204/196.01; 204/196.02; 204/196.03; 204/196.05; 204/196.06; 204/196.37; 205/729; 205/740
(58) Field of Search .................... 205/729, 740; 204/196.01, 196.37, 196.06, 196.02, 196.03, 196.05

(56) References Cited

U.S. PATENT DOCUMENTS

| 5,182,007 | * | 1/1993 | Takagi et al. | 205/729 |
| 5,868,920 | * | 2/1999 | Nylund et al. | 205/729 |

FOREIGN PATENT DOCUMENTS

| 4-78482  | 3/1992  | (JP) . |
| 4313379  | 11/1992 | (JP) . |
| 6-91821  | 11/1994 | (JP) . |
| 7-24822  | 3/1995  | (JP) . |
| 9248554  | 9/1997  | (JP) . |
| 10195682 | 7/1998  | (JP) . |

* cited by examiner

Primary Examiner—Bruce F. Bell
(74) Attorney, Agent, or Firm—Adams & Wilks

(57) ABSTRACT

An electrochemical stain prevention apparatus of a submerged structure comprising a submerged structure of which at least the stain prevention surface is formed of a conductive film that does not generate chlorine even by applying a potential of 5 V vs. SCE or less, a counter electrode located so as not to contact with the submerged structure, and a power supply unit for passing a direct current through the submerged structure having the conductive film formed thereon and the counter electrode. Aquatic organisms adhered to the surface of the conductive film can effectively be controlled by applying a potential of from 0.1 to 5 V vs. SCE to the submerged structure of such a stain prevention apparatus without generating chlorine. A potential applied to the conductive film of the submerged structure can be controlled with good accuracy by disposing a reference electrode between the submerged structure and the counter electrode. As the conductive film formed on the substrate of the submerged structure, a sprayed coating film made of a metal nitride can preferably be used.

39 Claims, 10 Drawing Sheets

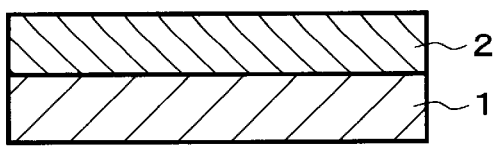
FIG. 16
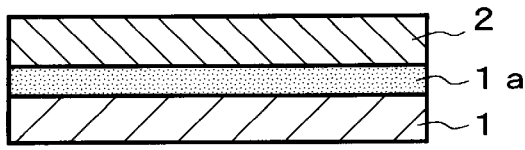
FIG. 17
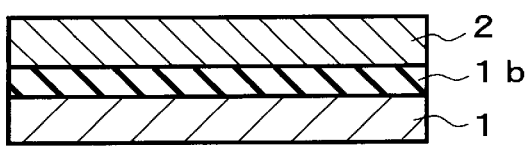
FIG. 18
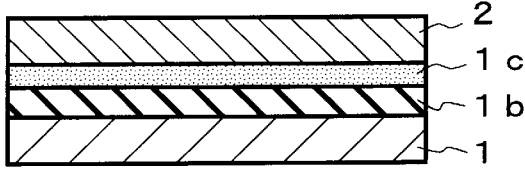
FIG. 19
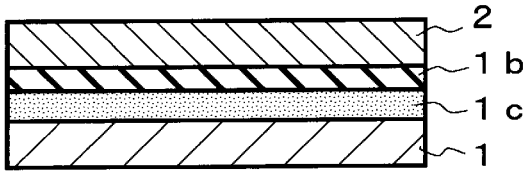
FIG. 20
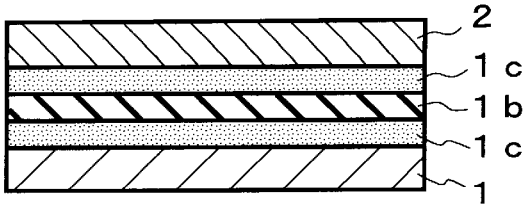
FIG. 21
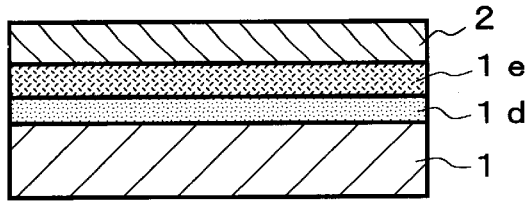
FIG. 22
FIG. 23
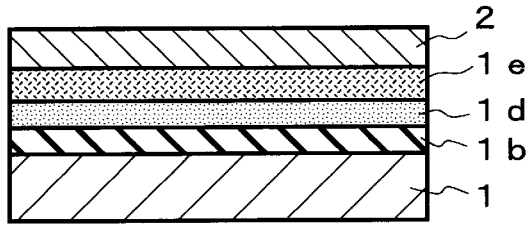
FIG. 24
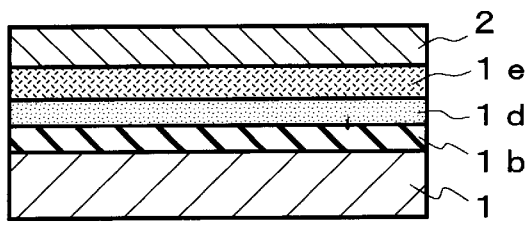
FIG. 25
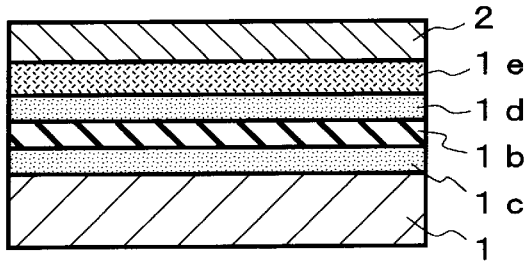

ELECTROCHEMICAL STAIN PREVENTION APPARATUS OF SUBMERGED STRUCTURE AND PROCESS FOR PRODUCING SUBMERGED STRUCTURE USED IN THIS APPARATUS

This application is a continuation of PCT/JP98/03784 filed Aug. 26, 1993.

TECHNICAL FIELD

The present invention relates to a stain prevention apparatus for submerged structures which is suitable for electrochemically controlling organisms adhered to water contact surfaces of submerged structures such as marine vessels, fishing nets, marine structures, cooling water intake pipes of marine vessels, cooling sea water intake pipes or cooling pipelines used in power plants or coastal plants, pipelines for transferring sea water, feed water pipelines and the like, and a process for producing submerged structures used in this stain prevention apparatus.

BACKGROUND OF THE INVENTION

A large number of organisms are present in sea water or fresh water, and these organisms show pathogenicity or are adhered to surfaces of submerged structures, causing various problems. For example, when organisms are adhered, a propulsion resistance is increased in marine vessels, a heat exchange efficiency is decreased in cooling pipelines used in thermal electric power plants, and large organisms which are adhered to insides of cooling pipelines and grown are removed to clog the cooling pipelines. Further, a large amount of water is used in food processing or production of drinking water and toiletries, and is supplied through feed water pipes. When microorganisms are adhered to insides of feed water pipes and grown, the microorganisms are incorporated into products, inviting serious defects in the quality of products.

Generally, a mechanism of adhering organisms to water contact surfaces of submerged structures is as follows. First, adhesive Gram-negative bacteria are adsorbed on surfaces of submerged structures to secrete large amounts of slime-like materials derived from lipids. Further, Gram-negative bacteria are gathered on this slime layer, and grown to form a biofilm. And large organisms such as algae, shellfish, barnacles and the like are adhered to this biofilm layer, and the large organisms adhered thereto are proliferated and grown, finally covering up the water contact surfaces of the submerged structures.

In recent years, as a method for preventing stains due to organisms adhered to water contact surfaces of submerged structures such as marine vessels, fishing nets, feed water pipes and the like, a method for electrochemically controlling organisms adhered to submerged structures without generating harmful substances such as chlorine and the like has been proposed. This electrochemical controlling method is performed such that when a potential above a predetermined potential at which a direct reaction with microorganisms has been identified is applied to the microorganisms, coenzyme A, one of the redox substances in microorganisms is reversibly oxidized, making it possible to kill microorganisms upon inducing the decrease in a breathing activity of microorganism and a permeation barrier of membranes of microorganisms (Japanese Patent Publication No. 6-91821/1994). That is, a method for preventing adhesion of large organisms by electrochemically controlling adhesion of Gram-negative bacteria is described.

As a stain prevention apparatus of for a submerged structure in contact with sea water or fresh water utilizing the above-described electrochemical controlling method, an apparatus is used comprising a submerged structure of which the water contact surface is coated with a conductive resin layer such as a conductive rubber, a conductive coating film or the like, a counter electrode disposed opposite so as not to come in contact with the conductive resin layer and a power supply for passing a direct current through the conductive resin layer and the counter electrode.

The conductive resin layer in the above-described stain prevention apparatus is formed by dispersing conductive fine particles of carbon black, graphite or the like into a synthetic resin. When a potential is applied to the conductive resin layer containing such conductive fine particles in sea water, sea water is electrolyzed to generate harmful chlorine. There is a fear that the chlorine gas generated might expedite corrosion of a submerged structure formed of a metal, inhibit growth of useful cultured fish and further influence ecosystem. Accordingly, when a conductive resin is used in an electrode, the potential control is conducted using a reference electrode for applying an accurate potential at which sea water is not electrolyzed (Japanese Patent Laid-Open No. 4-78482/1992 and Japanese Patent Laid-Open No. 4-313379/1992).

When an area of a counter electrode is smaller than an area of a conductive resin layer in the potential control using this reference electrode, the potential of the counter electrode is increased, and harmful chlorine is generated by electrolysis of sea water. Thus, it is required that the area of the counter electrode is widened and that the counter electrode is located opposite the conductive resin layer at a fixed distance between the counter electrode and the conductive resin layer. However, when a counter electrode of a large area is located opposite the hull in marine vessels, there occur the other problems such as the increase in the propulsion resistance due to the counter electrode, the damage of the counter electrode by contacting the counter electrode with a pier in the stop at a port, further the damage of the hull and the like. Moreover, in the cooling water intake pipeline, the volume inside the pipeline is limited. When a counter electrode of a large area is disposed, a water supply capacity is decreased, and further it is impossible to dispose a counter electrode in some type or structure of a submerged structure. Accordingly, a novel electrochemical stain prevention apparatus of a submersed structure which can solve the above-mentioned problems is in demand.

DISCLOSURE OF THE INVENTION

It is an object of the present invention to provide an electrochemical stain prevention apparatus of a submerged structure which can prevent adhesion of organisms, scales and the like to a surface of a submerged structure by electrochemical control of organisms and maintain a stain prevention effect for a long period of time, a process for producing a submerged structure used in this stain prevention apparatus, and further a method for electrochemically controlling organisms using this stain prevention apparatus.

That is, the electrochemical stain prevention apparatus of the submerged structure according to the present invention comprises a submerged structure of which at least the stain prevention surface is formed of a conductive film that does not generate chlorine even by applying a potential of 5 V vs. SCE or less, a counter electrode located so as not to contact with the submerged structure, and a power supply unit for passing a direct current through the submerged structure having the conductive film formed thereon and the counter electrode. Such an apparatus can be called a two-electrode system because it has two electrodes, the working electrode formed of the conductive film of the submerged structure and the counter electrode.

A reference electrode may be further mounted between the submerged structure and the counter electrode, making it possible to control a potential applied to the conductive film of the submerged structure with good accuracy. The apparatus having the reference electrode can be called a three-electrode system because it has three electrodes, the working electrode formed of the conductive film of the submerged structure, the counter electrode and the reference electrode.

In the electrochemical stain prevention apparatus of such a structure, the conductive film free from generation of chlorine is formed on the submerged structure. Accordingly, even in case of using the two-electrode system which is hard to control the applied potential accurately, generation of chlorine owing to the change in the potential does not occur, and thus, there is no fear of marine pollution due to harmful chlorine. Further, in case of the three-electrode system, chlorine is not generated from the conductive film even when the potential of the counter electrode changes, so that the area of the counter electrode can be decreased.

Another example of the electrochemical stain prevention apparatus of the submerged structure according to the present invention can comprise a submerged structure of which at least the stain prevention surface is formed of a conductive film that does not generate chlorine even by applying a potential of 5 V vs. SCE or less and in which the conductive film is divided with an insulating portion, and a power supply unit for passing a direct current through each of the conductive films divided with the insulating portion. In such a structure, a counter electrode is dispensed with, making it possible to simplify the structure of the apparatus.

The conductive film formed on the substrate of the submerged structure used in the stain prevention apparatus of the present invention can be formed of a metal or its compound. Specifically, it can be formed of any of a valve metal, a metal nitride, a metal carbide, a metal boride and a metal silicide. These conductive films have a high corrosion resistance, and are quite stable without dissolution by the potential application, and are high in wear resistance. Thus, they can control organisms and prevent a stain loss for a long period of time. Further, since these conductive films have a low electrical resistance value, the decrease in the potential due to the electrical resistance of the conductive film is reduced, and the organism stain loss of the submerged structure having a wide area can be prevented.

As a preferable conductive film, a sprayed coating film made of a metal nitride can be used. A process for producing a submerged structure having a conductive film formed of a sprayed coating film made of a metal nitride comprises the steps of forming a metal wire into molten metal particles, contacting the molten metal particles with a cooled nitrogen-containing gas to nitride the surfaces of the molten metal particles and to render the molten metal particles in a supercooled state, and laminating the molten metal particles in the supercooled state on the substrate of the submerged structure to form a sprayed coating film.

A preferable example of the power supply unit in the above-mentioned stain prevention apparatus of the three-electrode system has a potential control portion electrically connected with a working electrode formed of the conductive film of the submerged structure, the counter electrode and the reference electrode, and a data processing portion that indicates the control of the potential to the potential control portion. In the potential control portion, the potential indicated from the data processing portion is applied to the working electrode and the counter electrode, and the potentials of the reference electrode and the working electrode are measured to give the measured values to the data processing portion. In the data processing portion, the potential measured values given from the potential control portion are analyzed to adjust the indication of the potential control to the potential control portion. Such a feedback of the information from the potential control portion to the data processing portion can minimize the possibility of receiving the influence from the surrounding environment or exerting the influence on the surrounding environment.

When organisms are electrochemically controlled using the above-mentioned stain prevention apparatus, the potential of from 0.1 to 5 V vs. SCE is applied to the submerged structure having the conductive film formed thereon, whereby organisms can electrochemically be killed or controlled by a direct electron transfer reaction of organisms adhered to the surface of the conductive film and/or by an OH radical generated through electrolysis of water.

Further, the potential of from 1.5 V to 5 V vs. SCE is applied to the submerged structure having the conductive film formed thereon, whereby organisms adhered to the surface of the conductive film can electrochemically be killed or controlled by the OH radical generated through electrolysis of water.

BRIEF DESCRIPTION OF THE DRAWINGS

FIG. 16 is a sectional view showing an example of a laminated structure of a submerged structure having a conductive film.

FIG. 17 is a sectional view showing another example of a laminated structure of a submerged structure having a conductive film.

FIG. 18 is a sectional view showing still another example of a laminated structure of a submerged structure having a conductive film.

FIG. 19 is a sectional view showing still another example of a laminated structure of a submerged structure having a conductive film.

FIG. 20 is a sectional view showing still another example of a laminated structure of a submerged structure having a conductive film.

FIG. 21 is a sectional view showing still another example of a laminated structure of a submerged structure having a conductive film.

FIG. 22 is a sectional view showing an example of a laminated structure of a submerged structure having a conductive film made of a sprayed coating film of a metal nitride.

FIG. 23 is a sectional view showing another example of a laminated structure of a submerged structure having a conductive film made of a sprayed coating film of a metal nitride.

FIG. 24 is a sectional view showing still another example of a laminated structure of a submerged structure having a conductive film made of a sprayed coating film of a metal nitride.

FIG. 25 is a sectional view showing still another example of a laminated structure of a submerged structure having a conductive film made of a sprayed coating film of a metal nitride.

BEST MODE FOR CARRYING OUT THE INVENTION

Figure 1:
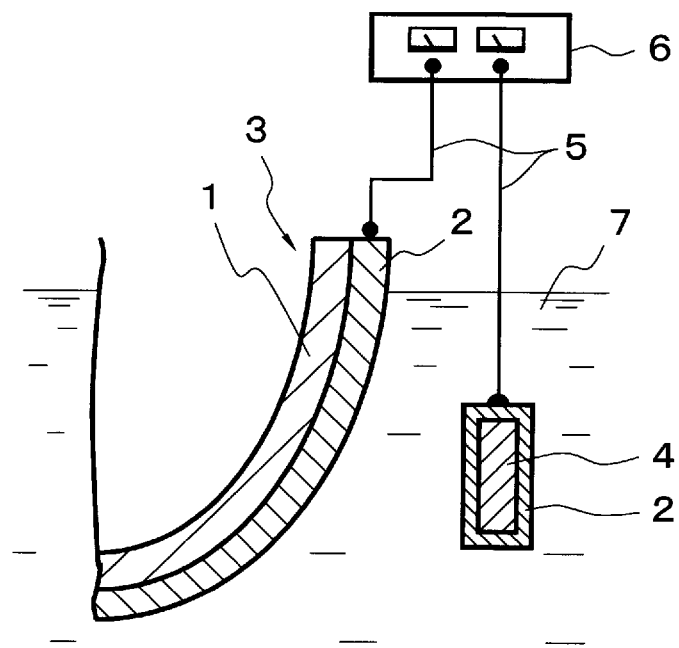
FIG. 1 is a view explaining an example of a stain prevention apparatus of a submerged structure according to the present invention.

Examples of the present invention are described in detail below by referring to the drawings attached.

FIG. 1 is a view explaining a stain prevention apparatus of a two-electrode system of a submerged structure in the present invention. A conductive film 2 that does not generate chlorine even by applying a potential of 5 V vs. SEC or less is formed on a surface (stain prevention surface) in contact with sea water or fresh water 7 on a substrate 1 of a submerged structure. The whole body in which the conductive film 2 is formed on the substrate 1 is called a submerged structure 3. The conductive film will be described later.

A counter electrode substrate 4 is disposed so as not to contact with the conductive film 2 of the submerged structure 3. A conductive film 2 that does not generate chlorine even by applying a potential of 5 V vs. SEC or less and which is the same as that formed on the substrate 1 of the submerged structure is formed on the surface of the counter electrode substrate 4. The conductive film 2 formed on the surface of the substrate 1 of the submerged structure 3 and the conductive film 2 formed on the surface of the counter electrode substrate 4 are connected with a power supply unit 6 through lead wires 5. The power supply unit 6 is a unit for passing a direct current through the conductive film 2 of the submerged structure 3 and the conductive film 2 of the counter electrode substrate 4, and it has a function capable of changing the polarity.

Figure 2:
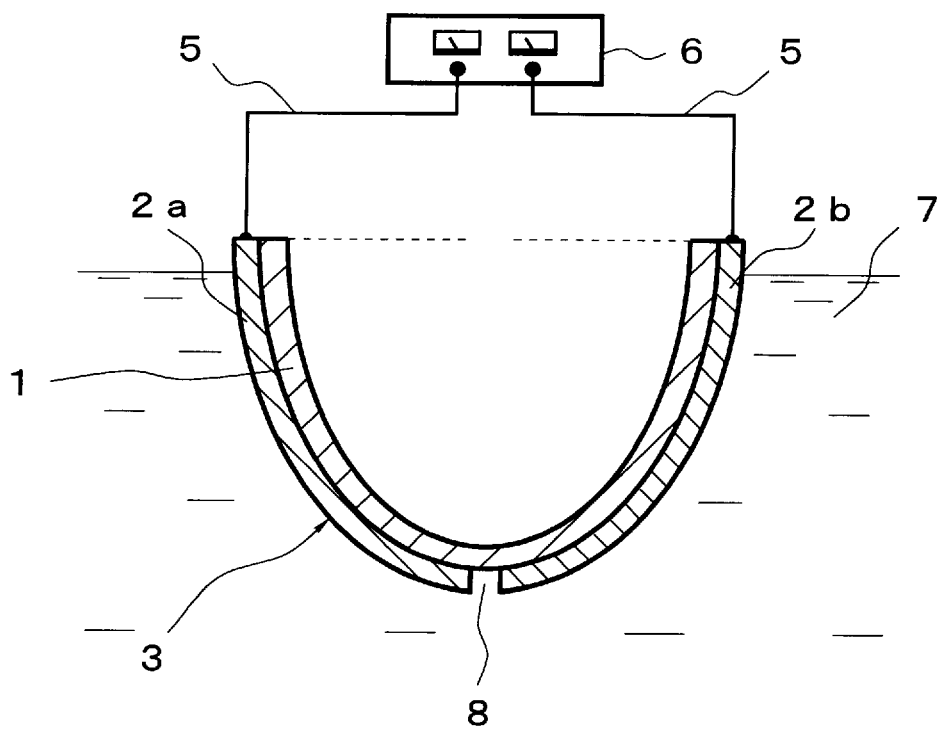
FIG. 2 is a view explaining another example of a stain prevention apparatus of a submerged structure according to the present invention.

FIG. 2 is a view explaining an example of a modified stain prevention apparatus of a two-electrode system of a submerged structure in the present invention. It is different from FIG. 1 in that a counter electrode is not mounted. The conductive film that does not generate chlorine even by applying a potential in sea water is formed on the surface of the substrate 1 of the submerged structure 3. This conductive film is divided into a conductive film 2a and a conductive film 2b in such a state that these are completely insulated with a fixed gap 8. This gap 8 may be filled with an insulating material such as an inorganic substance, an organic substance or an organic substance filled with an inorganic substance. The conductive films 2a and 2b are connected with the power supply unit 6 through the lead wires 5, respectively. Incidentally, when the stain prevention surface is wide, the conductive films 2a, 2b are further divided into many parts, whereby the effect of preventing adhesion of organisms is more increased.

Figure 3:
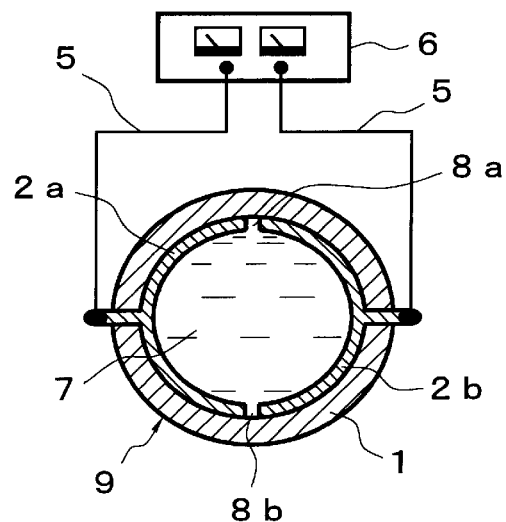
FIG. 3 is a view explaining still another example of a stain prevention apparatus of a submerged structure according to the present invention.

FIG. 3 is a view explaining an example in which a modified stain prevention apparatus of the two-electrode system of the submerged structure in the present invention is applied to a feed water pipe. A conductive film 2a and a conductive film 2b are formed on the inside of a substrate 1 of a feed water pipe 9 in such a state that these are completely insulated with fixed gaps 8a and 8b. Sea water or fresh water 7 is allowed to flow within the feed water pipe 9. The gap 8a and the gap 8b may be filled with an insulating material such as an inorganic substance, an organic substance or an organic substance filled with an inorganic substance. The conductive film 2a and the conductive film 2b are connected with a power supply unit 6 respectively through lead wires 5.

Figure 4:
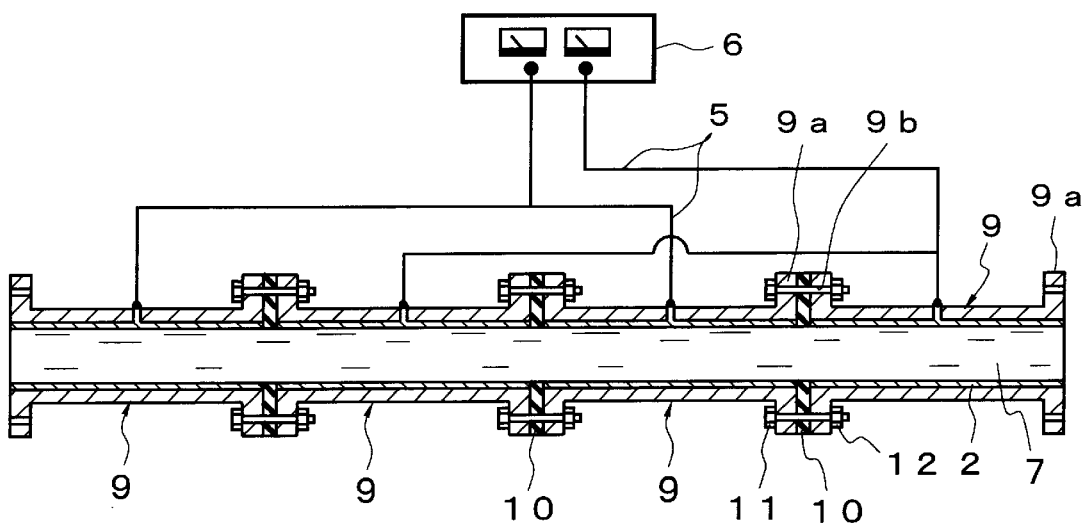
FIG. 4 is a view explaining still another example of a stain prevention apparatus of a submerged structure according to the present invention.

FIG. 4 is a view explaining an example in which a modified stain prevention apparatus of the two-electrode system of the submerged structure in the present invention is applied to a feed water pipe assembly. In this example, a conductive film 2 is formed on the inside of each feed water pipe 9, and a large number of feed water pipes are connected with flanges 9a, 9b mounted on outer surfaces of both ends of the feed water pipes 9 to provide a long feed water pipe assembly. A packing 10 made of a silicone rubber, NBR, a natural rubber or the like having an insulating property is put in a connecting portion between the adjacent flanges 9a, 9b to render the adjacent conductive films 2 formed on the insides of the feed water pipes 9 in the insulated state. By the way, the two flanges 9a, 9b of the connecting portion that hold the packing 10 are fixed with a bolt 11 and a nut 12. Sea water or fresh water 7 is allowed to flow within the assembly of the feed water pipes 9, and the conductive films 2 of the feed water pipes 9 are connected with a power supply unit 6 through lead wires 5, respectively.

Figure 5:
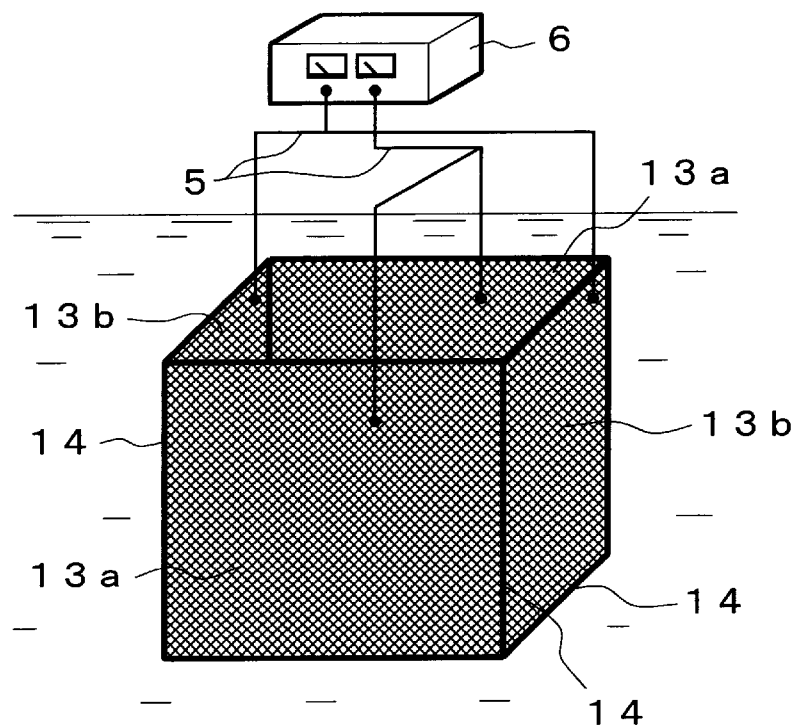
FIG. 5 is a view explaining still another example of a stain prevention apparatus of a submerged structure according to the present invention.

FIG. 5 is a view explaining an example in which a modified stain prevention apparatus of the two-electrode system of the submerged structure in the present invention is applied to a fishing net such as a fixed shore net, a fish preserve or the like. In a fishing net 13a and a fishing net 13b, a conductive film that does not generate chlorine even by applying a potential is formed on a substrate of the fishing net, and these are located in predetermined positions by being fixed on a frame 14 made of an insulating material. Further, the fishing net 13a and the fishing net 13b having the conductive films formed on the surfaces thereof are connected with a power supply unit 6 through lead wires 5, respectively.

When a voltage by which a potential capable of killing aquatic organisms is retained even when a conductivity of sea water or fresh water changes is applied to the conductive film 2 in the stain prevention apparatus of the two-electrode system shown in FIG. 1 by the power supply unit, a positive potential is applied to the conductive film 2 formed on the submerged structure, and a negative potential is applied to the conductive film 2 formed on the counter electrode substrate. At this time, the positive potential and the negative potential are periodically applied to the conductive film by periodically changing the polarities of the applied potentials, whereby aquatic organisms adhered to the surface of the conductive film can be killed and removed.

Meanwhile, in the modified examples of the stain prevention apparatus of the two-electrode system shown in FIGS. 2 to 5, the counter electrode is dispensed with. Accordingly, it can be used as a stain prevention apparatus of a complicated submerged structure in which the counter electrode cannot be mounted and further as a stain prevention apparatus of a feed water pipe formed of a complicated coiled tube having a small inner diameter.

In the conventional stain prevention apparatus of the two-electrode system, a potential was changed owing to the deviation from an equilibrium value of a potential due to polarization or the change in the conductivity of sea water, whereby it was difficult to accurately control a potential. Meanwhile, in the present invention, the conductive film that does not generate chlorine even by applying a potential in sea water is formed on the substrate of the submerged structure, whereby a voltage which is high enough to be able to maintain a potential capable of killing aquatic organisms can be applied and effective prevention of an organism stain loss can be conducted even when the change in the potential occurs by the polarization or the change in the conductivity of sea water. Further, even when a high potential is applied to the conductive film, there is no generation of harmful chlorine by electrolysis of sea water. Accordingly, even when the substrate of the submerged structure is formed of a metal having a low corrosion resistance, such as iron, aluminum or the like, the corrosion of the substrate does not occur, nor is there a fear of growth inhibition of cultured fish or marine pollution.

By the way, in the present specification, the "conductive film that does not generate chlorine even by applying a potential" refers to a case where chlorine in sea water which is measured with a residual chlorine electrode after applying a potential to a conductive film in 50 ml of sea water with a potentiostat for 30 minutes upon using platinum in a counter electrode and a reference electrode as a standard electrode is below the limit of detection.

Figure 6:
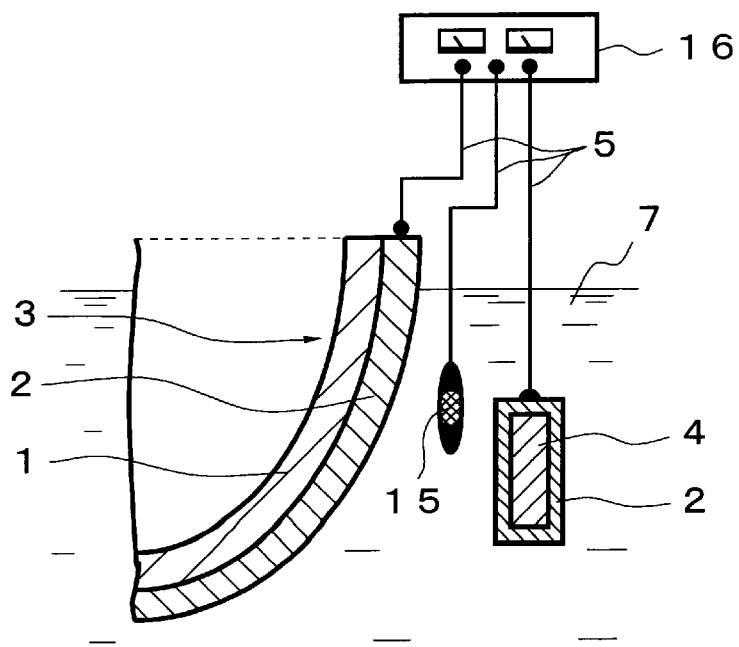
FIG. 6 is a view explaining still another example of a stain prevention apparatus of a submerged structure according to the present invention.

FIG. 6 is a view explaining a stain prevention apparatus of a three-electrode system of the submerged structure in the invention. There is disposed a reference electrode 15 for accurately controlling a potential applied to the conductive film 2 formed on the surface of the substrate 1 of the submerged structure. The reference electrode 15 is connected with a potentiostat 16, a direct current power supply unit, through a lead wire 5. Further, the conductive film 2 that does not generate chlorine even by applying a potential is formed on the surface of the counter electrode substrate 4 located so as not to contact with the conductive film 2 of the submerged structure 3. The conductive film 2 of the substrate 1 of the submerged structure and the conductive film 2 of the counter electrode substrate 4 are connected with the potentiostat 16 through lead wires 5. Since a potential capable of killing aquatic organisms is accurately applied to the conductive film on the surface of the submerged structure in the three-electrode system, aquatic organisms can be controlled with good accuracy, and further a consumptive power is also reduced as compared with the two-electrode system. Nevertheless, the potential of the counter electrode is not controlled. Therefore, when the surface area of the counter electrode is smaller than the surface area of the submerged structure, a current density of the counter electrode is increased, and a resistance value is changed by the change in the conductivity of scales, sea water or the like adhered to the surface of the counter electrode to increase the potential of the counter electrode and to cause generation of harmful chlorine. Accordingly, the use of the counter electrode on which surface the conductive film that does not generate chlorine even by applying a potential is formed makes it possible that chlorine is not generated even by the change in the potential of the counter electrode and that the surface area of the counter electrode is reduced, and thus, it can be used in the stain prevention apparatus of the complicated submerged structure.

As a material used in the counter electrode substrate 4, thermoplastic resins such as ABS, AS, a polycarbonate, an acrylic resin, PET, polyethylene, polypropylene, a polyimide resin and the like, and thermosetting resins such as bakelite, an unsaturated polyester resin and the like are used. Further, a metal which can be used as the conductive film 2 may be used as such, as the counter electrode substrate 4. Moreover, a material of a counter electrode conventionally used in general, for example, carbon materials such as carbon, carbon fibers, graphite and the like, iron and its alloy, platinum, gold, rhodium, palladium, oxides thereof and the like can be used as a material of the counter electrode. The form of the counter electrode may appropriately be designed according to the construction of the submerged structure, examples thereof being mesh-like, plate-like, cylindrical and linear forms.

Figure 7:
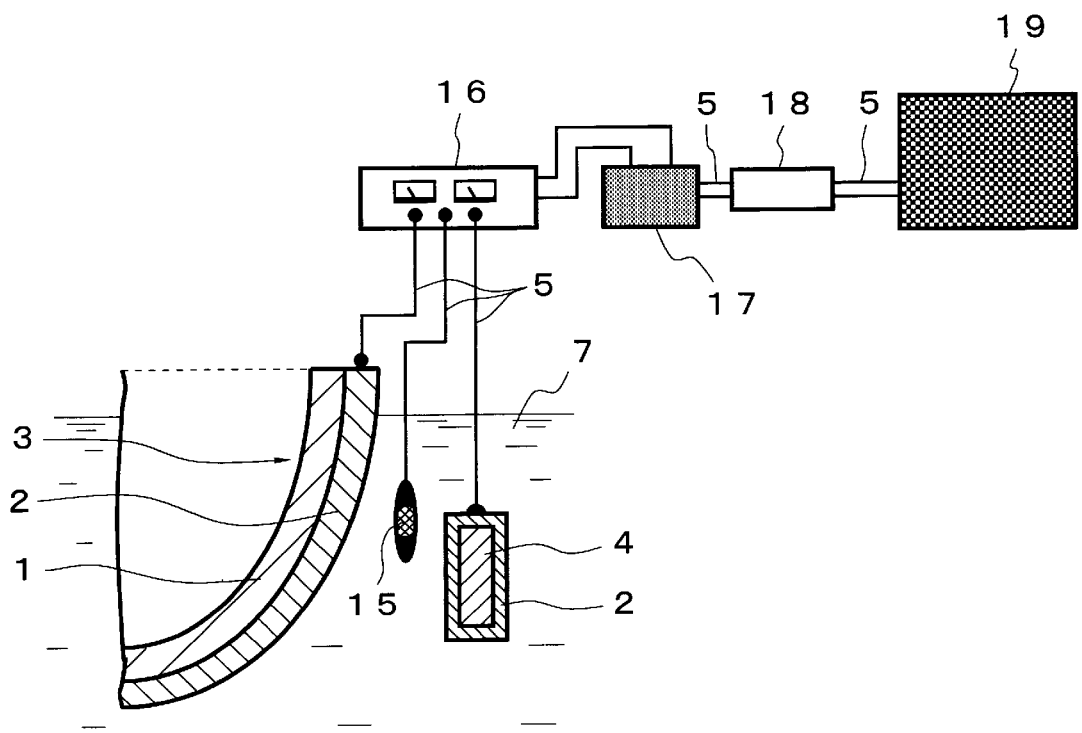
FIG. 7 is a view explaining still another example of a stain prevention apparatus of a submerged structure according to the present invention.

FIG. 7 is a view explaining another example of a stain prevention apparatus of a three-electrode system in the present invention, and shows an example in which the apparatus is located on sea or on a wide lake to which a power cannot be supplied from land through a transmission line. It is different from the example of FIG. 6 in a method for supplying a power to the power supply unit. That is, as a method for supplying a power to a potentiostat 16, a storage battery 17, a charging apparatus 18 and a solar battery 19 are used, and these are connected through a lead wire 5. As the storage battery 17, a lead storage battery, alkali storage batteries such as a nickel-cadmium battery, a nickel-hydrogen battery, a nickel-zinc battery, a zinc-air battery and the like, and a lithium secondary battery are used.

The power supply unit used in the potential control in the stain prevention apparatus of the present invention is described. The power supply unit can be a commercially available direct current power supply in which a polarity can periodically be converted. Further, a potentiostat is also used. The power supply unit in the present invention is for applying a potential to the conductive film having a wide area at good efficiency.

Figure 8:
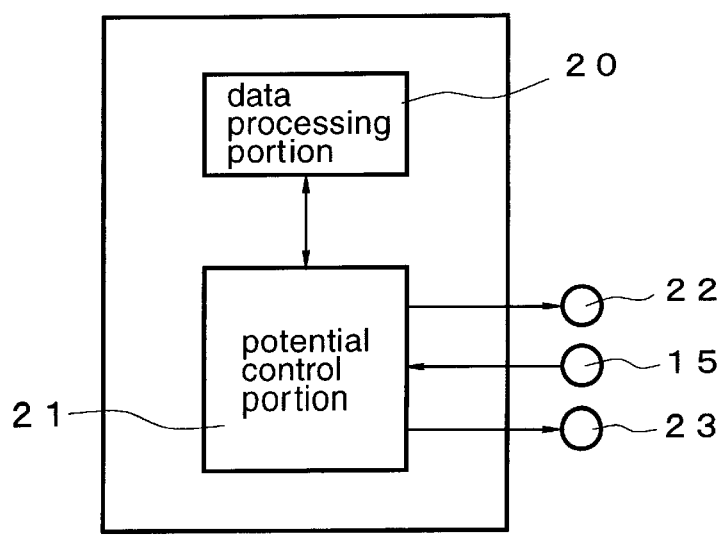
FIG. 8 is an electrical block diagram of a power supply unit in the electrochemical stain prevention apparatuses shown in FIGS. 6 and 7.
Figure 9:
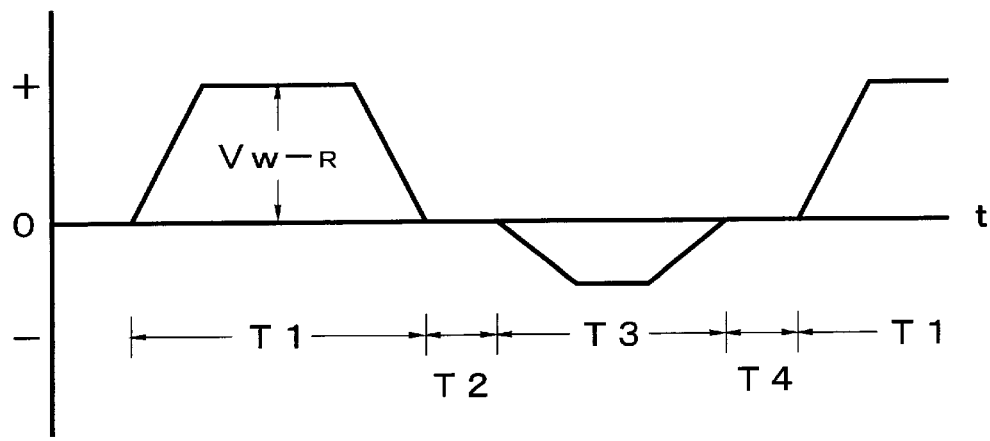
FIG. 9 is a timing chart of an output potential and an output time in the power supply unit of FIG. 8.
Figure 10:
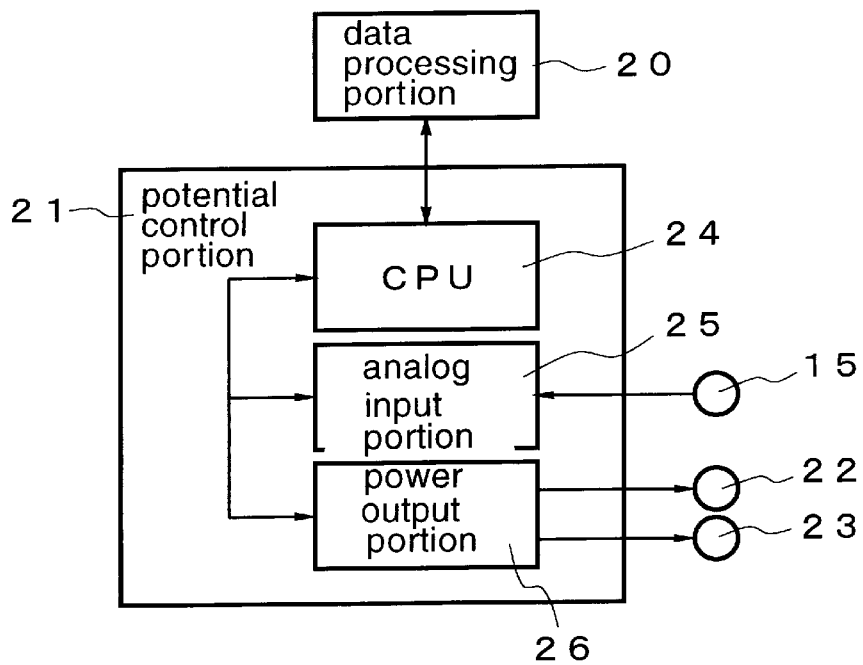
FIG. 10 is an electrical block diagram inside the potential control portion of FIG. 8.

A specific example of the power supply unit is described by referring to the electrical block diagram of the overall power supply unit shown in FIG. 8, the timing chart shown in FIG. 9 and the electrical block diagram of the inside of the potential control portion shown in FIG. 10. As is seen from FIG. 8, the power supply unit comprises a data processing portion 20 and a potential control portion 21. The timing chart (FIG. 9) of a potential outputted from a power output portion 26 (FIG. 10) of the potential control portion 21 and an output time of the potential at that time is set at the data processing portion 20. And the data of the timing chart set at the data processing portion 20 is sent to the potential control portion 21. In the potential control portion 21, a potential is applied to the working electrode 22 formed of the conductive film of the submerged structure and the counter electrode 23 on the basis of the timing chart sent from the data processing portion 20. Further, the potential to the working electrode 22 and the reference electrode 15 is inputted in the potential control portion 21, and the potential to the working electrode 22 and the reference electrode 15 and the actual condition of the present timing chart are sent to the data processing portion 20. In the data processing portion 20, the data of the sent potential to the working electrode and the reference electrode 15 is collected, the potential to the working electrode 22 and the reference electrode 15 and the actual condition of the present timing chart are analyzed, and a correction data of the potential to the working electrode 22 and the counter electrode 23 is sent to the potential control portion 21. Here, the working electrode 22, the counter electrode 23 and the reference electrode 15 are located in water.

Next, the electrical block diagram inside the potential control portion 21 in FIG. 10 is described. The potential control portion 21 is constructed from CPU 24, an analog input portion 25 and a power output portion 26. In CPU 24, the data of the timing chart of the potential applied to the working electrode 22 and the counter electrode 23 and its time and the correction data at that time which are sent from the data processing portion 20 are inputted, the time indicated in the timing chart is controlled, an output of a potential suited for that time is indicated in the power output portion 26, further an input of an external condition is indicated from the analog input portion 25, and the input information is outputted in the data processing portion 20. In the power output portion 26, the potential indicated in CPU 24 is generated through DAC (digital-to-analog converter), and a potential is applied to the working electrode 22 and the counter electrode 23. In the analog input portion 25, an external condition is inputted from ADC (analog-to-digital converter) indicated in CPU 24. For example, CPU 24 measures a potential to the working electrode 22 and the reference electrode 15 through ADC.

The timing chart shown in FIG. 9 is described in detail below. The ordinate axis depicts the potential outputted from the potential control portion 21, and the abscissa axis depicts the time axis at that time. "+" in the ordinate axis shows that a positive potential is applied to the working electrode 22 and the counter electrode 23 to kill aquatic organisms adhered to the working electrode 22. "−" shows that a negative potential is applied to the working electrode 22 and the counter electrode 23 to remove the killed aquatic organisms which are adhered to the working electrode 22. With respect to a method for applying a positive potential or a negative potential, waveforms of potentials can be changed by various methods, for example, by gradually applying a potential in the time axis relative to a desired potential, by directly applying a desired potential and the like. The timing chart of FIG. 9 shows the killing of aquatic organisms adhered to the working electrode 22 for a period T1, the removal of aquatic organisms adhered to the working electrode 22 for a period T3, a gradient to stop the killing of aquatic organisms adhered to the working electrode 22 for a period T2, and a gradient to stop the removal of aquatic organisms adhered to the working electrode 22 for a period T4, respectively.

Figure 11:
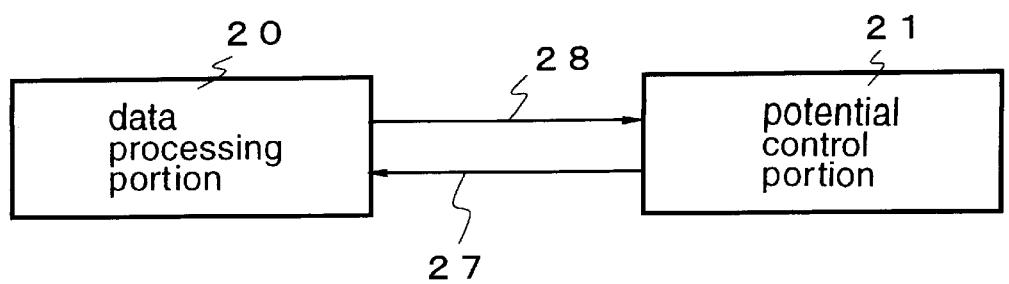
FIG. 11 is a block diagram of communication between the data processing portion and the potential control portion in the power supply unit of FIG. 8.

While FIG. 8 shows the example of the power supply unit in which the data processing portion 20 and the potential control portion 21 are combined, FIG. 11 shows an example in which the data processing portion 20 and the potential control portion 21 are separated and the data processing portion 20 controls the potential control portion 21 which is located in a remote position. In the example of FIG. 11, it is possible that the potential control portion 21 is, for example, sealed in a waterproof box (not shown) and sunk in water and the data processing portion 20 is mounted on land. The data processing portion 20 and the potential control portion 21 are connected through a communication line. In the data processing portion 20, as in the example of FIG. 8, the data of the timing chart of the set potential applied to the working electrode 22 and the counter electrode 23 and its time and the input data 27 from the potential control portion 21 are analyzed, the correction data is transmitted to the potential control portion 21 as control data 28, and the data of the external condition is received from the potential control portion 21 as input data 27.

Figure 12:
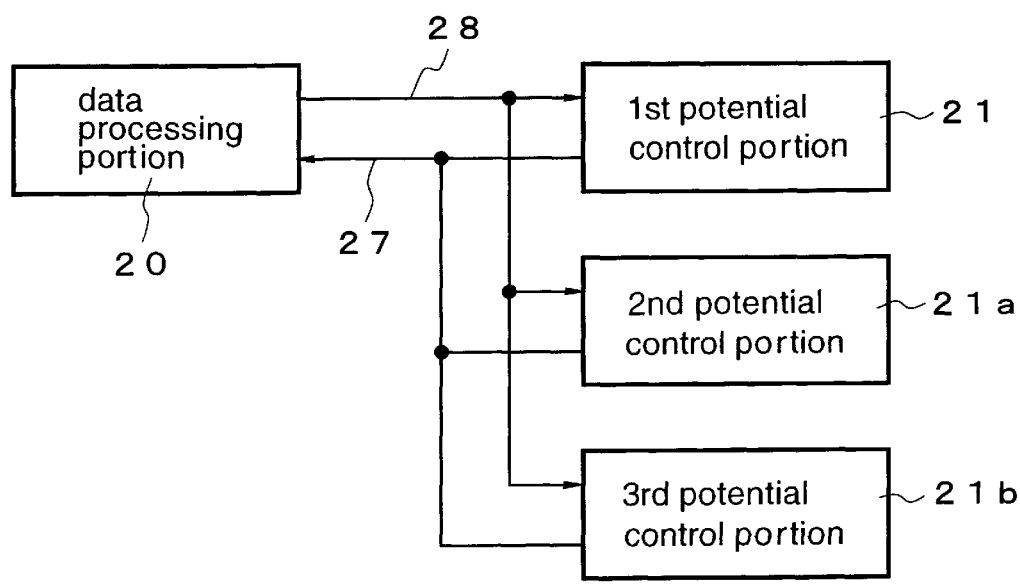
FIG. 12 is a block diagram of communication between the data processing portion and the potential control portion of an example having a plurality of potential control portions in FIG. 11.

An example of a power supply unit shown in FIG. 12 comprises one data processing portion 20, and a plurality of potential control portions such as a first potential control portion 21, a second potential control portion 21a and a third potential control portion 21b. As in the example of FIG. 11, the communication of control data 28 and input data 27 is conducted between the data processing portion 20 and each of the potential control portions 21, 21a, 21b. In this case, it is possible, for example, that the data processing portion 20 is mounted on land, and the first potential control portion 21, the second potential control portion 21a and the third potential control portion 21b are sealed in waterproof boxes, respectively, and sunk in plural portions in water. As in the example of FIG. 11, the data processing portion 20 is connected with the first potential control portion 21, the second potential control portion 21a and the third potential control portion 21b through a communication line, respectively. In the data processing portion 20, the data of the timing chart of the set potential applied to the working electrode 22 and the counter electrode 23 and its time and the input data 27 from the plural potential control portions 21, 21a and 21b are analyzed, the correction data is transmitted to the plural potential control portions 21, 21a, 21b as control data 28, and the data of the external condition is received from the plural potential control portions 21, 21a, 21b as input data 27. The data processing portion 20 and the plural potential control portions 21 can be connected through, for example, an interface RS-485.

Figure 13:
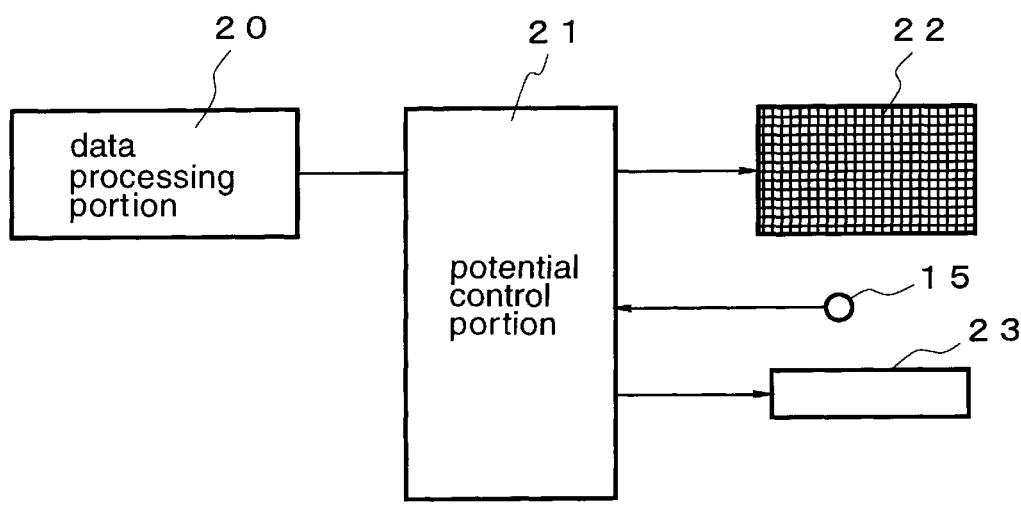
FIG. 13 is an electrical block diagram of a power supply unit in an example using a net-like submerged structure.

An example shown in FIG. 13 illustrates, as shown in FIG. 8, a basic construction in which a working electrode 22, a counter electrode 23 and a reference electrode 15 are connected with a potential control portion 21. With respect to a specific mode of each electrode, it comprises a working electrode 22 in which a conductive substrate is arranged in the net form (refer to FIG. 5), a counter electrode 23 made of a plate-like conductive substrate and a reference electrode 15 made of a bar-like conductive substrate. These three electrodes are sunk in water to conduct the killing and the removal of aquatic organisms in water that are adhered to the working electrode 22.

Figure 14:
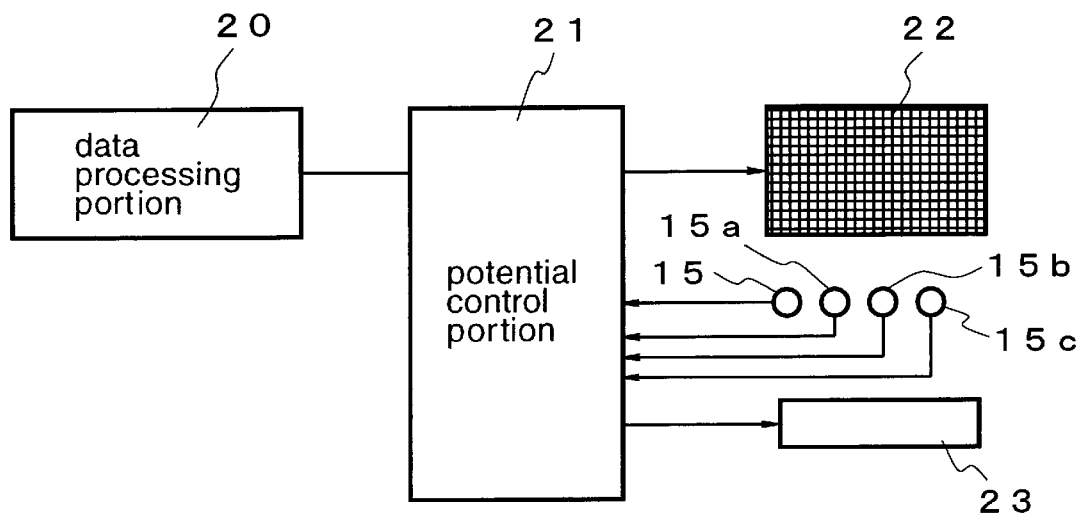
FIG. 14 is an electrical block diagram of an example having a plurality of reference electrodes in FIG. 13.

An example shown in FIG. 14 is obtained by modifying the construction of the example shown in FIG. 13 to provide a plurality of reference electrodes, namely a first reference electrode 15, a second reference electrode 15a, a third reference electrode 15b and a fourth reference electrode 15c. When a working electrode 22 having a larger surface area than the net-like working electrode 22 in the example of FIG. 13 is used, it is advisable to dispose the plural reference electrodes 15, 15a, 15b, 15c along the net-like working electrode 22. In this case, the respective potentials to the working electrode 22 and the plural reference electrodes 15, 15a, 15b and 15c are inputted in the analog input portion 25 (FIG. 10) of the potential control portion 21, and the data of the respective potentials are transmitted to the data processing portion 20 through CPU 24 (FIG. 10) of the potential control portion 21. In the data processing portion 20, the data transmitted are collected, and analyzed; an average value, a maximum value and a minimum value are calculated; and the average value is made a reference value of a potential to the working electrode 22 and the plural reference electrodes 15, 15a, 15b and 15c. Alternatively, one of the plural potentials to the working electrode 22 and the plural reference electrodes 15, 15a, 15b and 15c can be made a reference value.

Here, when the present timing chart indicates the "+" side relative to the potential control portion 21, namely a state in which a positive potential is applied to the working electrode 22 and the counter electrode 23 to kill aquatic organisms in water adhered to the working electrode 22 and the maximum value exceeds the upper limit of from +0 to +1.5 vs. SCE, the correction data to decrease the potential to the working electrode 22 and the counter electrode 23 is transmitted from the data processing portion 20 to the potential control portion 21 so as to render the maximum value within the range of from +0 to +1.5 V vs. SCE. Unless the maximum value exceeds the upper limit, that condition is maintained. Further, when the timing chart indicates the "−" side relative to the potential control portion 21, namely a state in which a negative potential is applied to the working electrode 22 and the counter electrode 23 to remove aquatic organisms in water adhered to the working electrode 22 and the minimum value is less than the lower limit of from −0 to −0.4 V vs. SCE, the correction data to increase the potential to the working electrode 22 and the counter electrode 23 is transmitted from the data processing portion 20 to the potential control portion 21 so as to render the minimum value within the range of from −0 to −0.4 V vs. SCE. Unless the minimum value is less than the lower limit, that condition is maintained.

Figure 15:
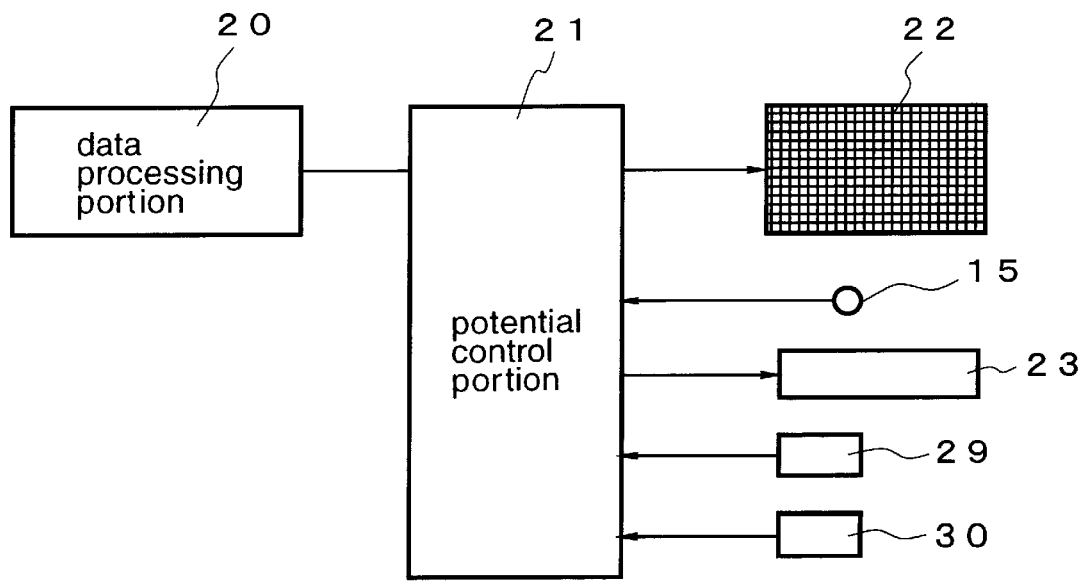
FIG. 15 is an electrical block diagram of an example in which a temperature sensor and a pH sensor are mounted in the example of FIG. 13.

In an example shown in FIG. 15, a temperature sensor 29 for detecting a water temperature and a pH sensor 30 for detecting an acidity in water are added to the construction of the example shown in FIG. 13, and these sensors are electrically connected with the analog input portion 25 (FIG. 10) of the potential control portion 21. Since a potential is applied to the working electrode 22 and the counter electrode 23, there is a possibility of causing electrolysis in water, e.g. in sea water to change the acidity. Therefore, the change in the acidity can be detected by the pH sensor 30. The data from the temperature sensor 29 and the pH sensor 30 are inputted into the analog input portion 25 of the potential control portion 21, and transmitted to the data processing portion 20 through CPU 24. In the data processing portion 20, the data transmitted are collected, and analyzed.

When it is judged in the data processing portion 20 that the data of the temperature sensor 29 is a water temperature indicating an activity of aquatic organisms in water and the present timing chart indicates the "+" side relative to the potential control portion 21, namely a state in which a positive potential is applied to the working electrode 22 and the counter electrode 23 to kill aquatic organisms in water adhered to the working electrode 22, the correction data to increase the potential to the working electrode 22 and the counter electrode 23 is transmitted from the data processing portion 20 to the potential control portion 21 so as to render the potential to the working electrode 22 and the counter electrode 23 within the range of from +0 to +1.5 V vs. SCE. Further, when the present timing chart indicates the "−" side relative to the potential control portion 21, namely a state in which a negative potential is applied to the working electrode 22 and the counter electrode 23 to remove aquatic organisms in water adhered to the working electrode 22, the correction data to decrease the potential to the working electrode 22 and the counter electrode 23 is transmitted from the data processing portion 20 to the potential control portion 21 so as to render the potential to the working electrode 22 and the counter electrode 23 within the range of from −0 to −0.4 V vs. SCE.

Although the foregoing description is with respect to the correction data for changing the potential to the working electrode 22 and the counter electrode 23, the correction data for changing a potential application time can also be used. That is, when it is judged in the data processing portion 20 that the data of the temperature sensor 29 is a water temperature indicating an activity of aquatic organisms in water and the present timing chart indicates the "+" side relative to the potential control portion 21, namely a state in which a positive potential is applied to the working electrode 22 and the counter electrode 23 to kill aquatic organisms in water adhered to the working electrode 22, the correction data to prolong a time of applying a potential to the working electrode 22 and the counter electrode 23 in the range of from +0 to +1.5 V vs. SCE is transmitted from the data processing portion 20 to the potential control portion 21 so as to prolong the time of applying a potential to the working electrode 22 and the counter electrode 23. Further, when the present timing chart indicates the "−" side relative to the potential control portion 21, namely a state in which a negative potential is applied to the working electrode 22 and the counter electrode 23 to remove aquatic organisms in water adhered to the working example 22, the correction data to prolong a time of applying a potential to the working electrode 22 and the counter electrode 23 in the range of from −0 to −0.4 V vs. SCE is transmitted from the data processing portion 20 to the potential control portion 21 so as to prolong the time of applying a potential to the working electrode 22 and the counter electrode 23.

Likewise, when a data according to the pH sensor 30 shows a limit value at which to start electrolysis in the data processing portion 20 and the present timing chart indicates the "+" side relative to the potential control portion 21, namely a state in which a positive potential is applied to the working electrode 22 and the counter electrode 23 to kill aquatic organisms in water adhered to the working electrode 22, the correction data to decrease the potential to the working electrode 22 and the counter electrode 23 is transmitted from the data processing portion 20 to the potential control portion 21 so as not to cause electrolysis. Further, when the present timing chart indicates the "−" side relative to the potential control portion 21, namely a state in which a negative potential is applied to the working electrode 22 and the counter electrode 23 to remove aquatic organisms in water adhered to the working electrode 22, the correction data to increase the potential to the working electrode 22 and the counter electrode 23 is transmitted from the data processing portion 20 to the potential control portion 21. However, when the temperature sensor 29 and the pH sensor 30 are both mounted, the data of the pH sensor 30 is preferentially transmitted to the potential control portion 21 whereby the data processing portion 20 treats most preferentially the case where the data from the pH sensor 30 indicates the limit value at which electrolysis begins.

The substrate of the submerged structure used in the stain prevention apparatus of the present invention is described below.

FIG. 16 and FIG. 17 are views that schematically show an example of a laminated structure of a substrate 1 and a conductive film 2 in which the substrate of the submerged structure is made of a material that is not dissolved nor corroded electrochemically. As the substrate 1, a metallic material, a resin material, an inorganic material and a natural material can be used. As the metallic material, valve metals such as titanium and its alloy, tantalum and its alloy, zirconium and its alloy, niobium and its alloy, and the like are mentioned. Since these valve metals can be used also as a material of the conductive film 2, it is also possible that the substrate 1 of the submerged structure and the conductive film 2 are integrated and produced from the valve metals. As the resin material, ABS, AS, polyester, polystyrene, polycarbonate, polyethylene, polypropylene, nylon, vinyl chloride, PET, FRP, aliphatic polyamides such as 6-nylon, 6,6-nylon, 1,2-nylon and the like, aromatic polyamides such as nomex and the like, alicyclic polyamides such as Kevler and the like, and so forth are mentioned. As the inorganic material, glass, alumina, zirconia, cement, graphite, carbon fibers and the like are mentioned. As the natural material, wood, stone, silk, cotton, hemp and the like are mentioned. The form of these materials is not particularly limited so long as it is a fibrous form or a form having a function of maintaining the structure.

FIG. 16 is an example in which the conductive film 2 is directly formed on the surface of the submerged structure 1. FIG. 17 is an example in which the conductive film 2 is laminated on the substrate 1 through an adhesive layer 1a. Incidentally, the adhesive used in the adhesive layer 1a includes a pressure-sensitive adhesive, a hot-melt adhesive, an anaerobic adhesive and the like, and these may be used either alone or in admixture of two or more.

FIGS. 18 to 21 are views that schematically show an example of a laminated structure of the substrate 1 and the conductive film 2 when the substrate of the submerged structure is made of a material that is dissolved or corroded electrochemically. Examples of the material that is dissolved or corroded include metallic materials such as iron and its alloy or stainless steel, aluminum and its alloy, copper and its alloy, zinc and its alloy, magnesium and its alloy, and so forth. FIG. 18 shows an example of a laminated structure in which an insulating layer 1b is interposed between the substrate 1 and the conductive film 2 formed on the water contact surface. As the material of the insulating layer 1b, inorganic insulating materials made of oxides such as alumina, zirconia, titanium oxide, silicon oxide and the like, insulating resins such as an unsaturated polyester resin, an acrylic-urethane resin, a polyester-urethane resin, a silicone-urethane resin, a silicone-acrylic resin, an epoxy resin, a thermosetting melamine-alkyd resin, a melamine-acrylic resin, a melamine-polyester resin, an acrylic resin, an acrylic-urethane resin, a polyimide resin and the like, insulating resin films made of a polyethylene resin, a polypropylene resin, a polyester resin, a polyimide resin, a polystyrene resin, a fluorocarbon resin, a PTFE resin and the like, and so forth are mentioned.

FIG. 19 is an example in which an insulating layer 1b is formed on the substrate 1 and the conductive film 2 is laminated on this insulating layer 1b through an adhesive layer 1c. With respect to materials of the insulating layer 1b and the adhesive layer 1c, the same insulating material and adhesive as those described in the lamination example of FIG. 17 can be used.

FIG. 20 is an example in which an insulating layer (insulating resin film in this example) 1b is formed on the substrate 1 through the same adhesive layer 1c as the above-mentioned and the conductive film 2 is laminated on this insulating layer 1b. Further, FIG. 21 is an example in which an adhesive layer 1c is further interposed between the insulating layer 1b and the conductive film 2 in the laminated structure of FIG. 20.

Next, the conductive film 2 formed on the water contact surface of the submerged structure is described. The conductive film used in the present invention is formed of a metal or its compound in which chlorine is not generated even by applying a potential of 5 V vs. SCE or less. As the metal, valve metals, specifically, titanium and its alloy, tantalum and its alloy, zirconium and its alloy, niobium and its alloy, vanadium and its alloy, hafnium and its alloy, molybdenum and its alloy, tungsten and its alloy, and so forth are mentioned. These valve metals can be used as a film having a thickness of 0.1 $\mu$m or more. The upper limit of the thickness is not particularly restricted, and it can appropriately be determined depending on a method for forming a conductive film or a use purpose. By the way, with respect to the valve metal used as the conductive film, a thin oxide coating film may be formed on its surface. Further, it may contain two or more metals, and oxides, nitrides, carbides and the like of these metals depending on the forming method.

As the conductive film 2 of the submerged structure, one or more types of metallic compounds such as a metal nitride, a metal carbide, a metal boride, a metal silicide and the like can be used. As the metal nitride, titanium nitride, zirconium nitride, vanadium nitride, tantalum nitride, niobium nitride, chromium nitride and the like are mentioned. As the metal carbide, titanium carbide, zirconium carbide, vanadium carbide, niobium carbide, tantalum carbide, chromium carbide, molybdenum carbide, tungsten carbide and the like are mentioned. As the metal boride, titanium boride, zirconium boride, hafnium boride, vanadium boride, niobium boride, tantalum boride, chromium boride, molybdenum boride, tungsten boride and the like are mentioned. As the metal silicide, titanium silicide, zirconium silicide, niobium silicide, tantalum silicide, vanadium silicide, tungsten silicide and the like are mentioned. These metallic compounds can be used as a film having a thickness of 0.1 $\mu$m or more. The upper limit of the thickness is not particularly restricted, and it can appropriately be determined depending on a method for forming a conductive film or a use purpose. Incidentally, these metallic compounds can also be used in admixture of two or more, and may further contain two or more metals, oxides thereof and the like depending on the forming method.

The method in which the conductive film formed of the valve metal or the metallic compound such as the metal nitride, the metal carbide, the metal boride, the metal silicide or the like is formed on the substrate of the submerged structure can appropriately be selected depending on the use purpose. For example, a physical deposition method such as sputtering or ion plating, and a spraying method such as plasma spraying, arc spraying, low-pressure spraying, low-temperature spraying or the like can be employed. In the formation of the conductive film formed of the metal nitride, the metal carbide, the metal boride or the metal silicide, for example, the following methods can be employed. With respect to the metal nitride, metals constituting the metal nitride, such as titanium, zirconium, tantalum, chromium and the like are treated by an ion nitriding method in which these are treated with nitrogen ion in vacuum under bias, a gas nitriding method in which these are heat-treated in air in an atmosphere of nitrogen or ammonia gas, a salt bath nitriding method in which these are dipped in a molten salt containing NaCN or NaCNO or the like, whereby a nitride film can be formed on the surfaces of these metals. With respect to the metal carbide, metals constituting the metal carbide, for example, titanium, zirconium, tantalum, chromium and the like are treated by a gas carbonization method in which these are heat-treated in an atmosphere of a CO-containing gas, a salt bath carbonization method in which these are dipped in a molten salt composed mainly of NaCN, an electrolytic carbonization method in which cathode electrolysis is conducted in a molten salt composed mainly of a carbonate such as $Na_2CO_3$ or the like, whereby a carbide film can be formed on the surfaces of these metals. With respect to the metal boride, metals constituting the metal boride, such as titanium, zirconium, niobium, tantalum and the like are treated by a gas boronizing method in which these are heat-treated in an atmosphere of a gas containing hydrogen and diborane, a melt-boronizing method in which these are dipped in a molten salt composed mainly of borax, an electrolytic boronizing method in which cathode electrolysis is conducted in a molten salt composed mainly of borax or the like, whereby a boride film can be formed on surfaces of these metals. With respect to the metal silicide, the metals constituting the metal silicide are treated by a siliconizing method in which heat treatment is conducted in an atmosphere of a mixed gas of $SiCl_4$ and hydrogen or nitrogen, whereby a silicide film can be formed on the surfaces of the metals.

In the stain prevention apparatus of the present invention, a submerged structure in which a sprayed coating film formed of a metal nitride is formed as the conductive film on the substrate of the submerged structure can be used especially preferably. FIGS. 22 to 25 are views that schematically show an example of a laminated structure in which a sprayed coating film of a metal nitride is formed on the substrate 1 of the submerged structure.

FIG. 22 is an example in which the substrate 1 is formed of a material other than the metal, such as a resin material, an inorganic material or a natural material, a fiber layer 1e is laminated on the surface of such a substrate 1 through an adhesive layer 1d and the conductive film 2 made of the metal nitride is formed on this fiber layer 1e by spraying. When the substrate 1 is a resin, it is advisable to form fine raisings and depressions (not shown) on the surface of the substrate 1 by blast treatment or chemical etching treatment in order to enhance an adhesion strength between the substrate 1 and the adhesive layer 1d though it depends on the type of the resin or the type of the adhesive.

As the adhesive used in the adhesive layer 1d, any type of the adhesive can be used so long as it is excellent in the sea water resistance or the water resistance. For example, a pressure-sensitive adhesive, hot-melt adhesive, a two component curable adhesive, an anaerobic adhesive and the like are mentioned. Such an adhesive layer 1d can be formed by a spraying method, brush coating, a roll coater method or the like.

As the fiber layer 1e, any of a natural fiber, an inorganic fiber and a synthetic fiber, or a fabric or a mesh woven by mixing these fibers is used. As the natural fiber, cotton, hemp, silk, wool and the like are mentioned. As the inorganic fiber, asbestos, a glass fiber, a carbon fiber and the like are mentioned. As the synthetic fiber, a viscose rayon, an acetate fiber, a polyamide-based fiber (aliphatic polyamide, aromatic polyamide or alicyclic polyamide), a polyester-based fiber (polyethylene terephthalate fiber), an acrylonitrile-based fiber, a modacrylic fiber, a polyvinyl chloride-based fiber, a polyvinylidene chloride-based fiber, a polyolefin-based fiber ( polyethylene fiber or polypropylene fiber), a polyurethane-based fiber, polychlal-based fiber, a fluorocarbon-based fiber, a polyglycol fiber, a phenol-based fiber and the like are mentioned.

FIGS. 23 to 25 show examples of a laminated structure in which the substrate 1 is formed of a metal. In FIG. 23, the adhesive layer 1d is formed on the substrate 1 through the insulating layer 1b, the fiber layer 1e is laminated on the adhesive layer 1d, and the conductive film 2 made of the metal nitride is formed on the surface of the fiber layer 1e by spraying. The insulating layer 1b is interposed between the substrate 1 and the adhesive layer 1d for improving the adhesion therebetween. The insulating layer 1 is interposed to prevent corrosion or dissolution of the substrate 1 because when a potential is applied to the conductive film 2 in water or in sea water, corrosion or dissolution occurs in some type of the metal of the substrate 1 and the fiber layer 1e is sometimes peeled off. Further, as required, the metal surface of the substrate 1 may be roughened by blast treatment or etching treatment, or low-boiling metallic materials such as aluminum and its alloy, zinc and its alloy, magnesium and its alloy, nickel and its alloy, chromium and its alloy, and so forth may be formed on the surface of the metal by spraying or plating.

FIG. 24 shows an example in which after the insulating layer 1b made of an insulating coating film is formed on the substrate 1, the fiber layer 1e is laminated through the adhesive layer 1d and the conductive film 2 made of the metal nitride is formed on the surface of the fiber layer 1e by spraying.

FIG. 25 shows an example in which the insulating layer 1b made of the insulating resin film is laminated on the substrate 1 through the adhesive layer 1c, the fiber layer 1e is laminated on the insulating layer 1b through the adhesive layer 1d, and the conductive film 2 made of the metal nitride is formed on the surface of the fiber layer 1e by spraying.

Figure 26:
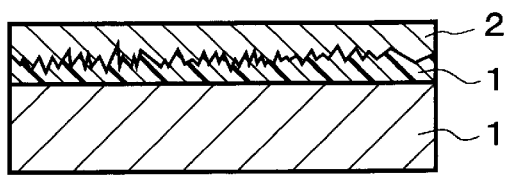
FIG. 26 is a sectional view showing still another example of a laminated structure of a submerged structure having a conductive film made of a sprayed coating film of a metal nitride.
Figure 28:
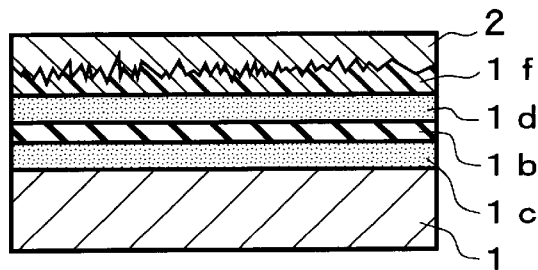
FIG. 28 is a sectional view showing still another example of a laminated structure of a submerged structure having a conductive film made of a sprayed coating film of a metal nitride.
Figure 27:
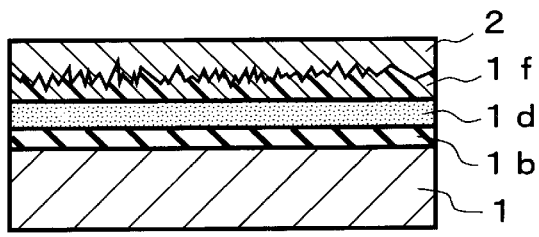
FIG. 27 is a sectional view showing still another example of a laminated structure of a submerged structure having a conductive film made of a sprayed coating film of a metal nitride.

In the lamination examples of FIGS. 26 to 28, not the fiber layer 1e used in the lamination examples of FIGS. 22 to 25 but a resin layer 1f containing an inorganic powder having a particle diameter of from 10 to 200 $\mu$m is used. The inorganic powder contained in the resin layer 1f includes alumina, zirconia, silicon oxide and titanium oxide, and these can be used alone or in admixture of two or more. The inorganic powder is mixed within the range of from 10 to 300% by weight based on the solid content of the resin used. As the resin used in the resin layer 1f, a two component curable unsaturated polyester resin, an acrylic-urethane resin, a polyester-urethane resin, a silicone-urethane resin, a silicone-acrylic resin, an epoxy resin, a thermosetting melamine-alkyd resin, a melamine-acrylic resin, a melamine-epoxy resin, an acrylic resin, an acrylic-urethane resin and the like are mentioned. These can be used alone or in admixture of two or more. This resin layer 1f can be formed by coating the resin by a spraying method, a brush coating method, a roll coater method or the like, and then conducting air-drying or heat-drying.

FIG. 26 is an example in which the resin layer 1f is formed on the substrate 1 made of a resin and the conductive film 2 made of the metal nitride is then formed by spraying. By the way, in this example, the surface of the substrate 1 made of the resin is roughened by blast treatment or chemical etching to enhance the adhesion between the substrate 1 and the resin layer 1f.

FIG. 27 is an example in which the insulating layer 1b made of the insulating coating film is formed on the substrate 1 made of the metal, the resin layer if is then formed through the adhesion layer 1d, and the conductive film 2 made of the metal nitride is formed on the surface of the resin layer if by spraying.

FIG. 28 is an example in which the insulating layer 1b made of the insulating resin film is laminated on the substrate 1 made of the metal through the adhesive layer 1c, the resin layer 1f is formed on the insulating layer 1b through the adhesive layer 1d and the conductive film 2 made of the metal nitride is formed on the surface of the resin layer 1f by spraying.

A method in which the above-mentioned conductive film made of the sprayed coating film of the metal nitride is formed on the stain prevention surface of the submerged structure is described below.

Figure 29:
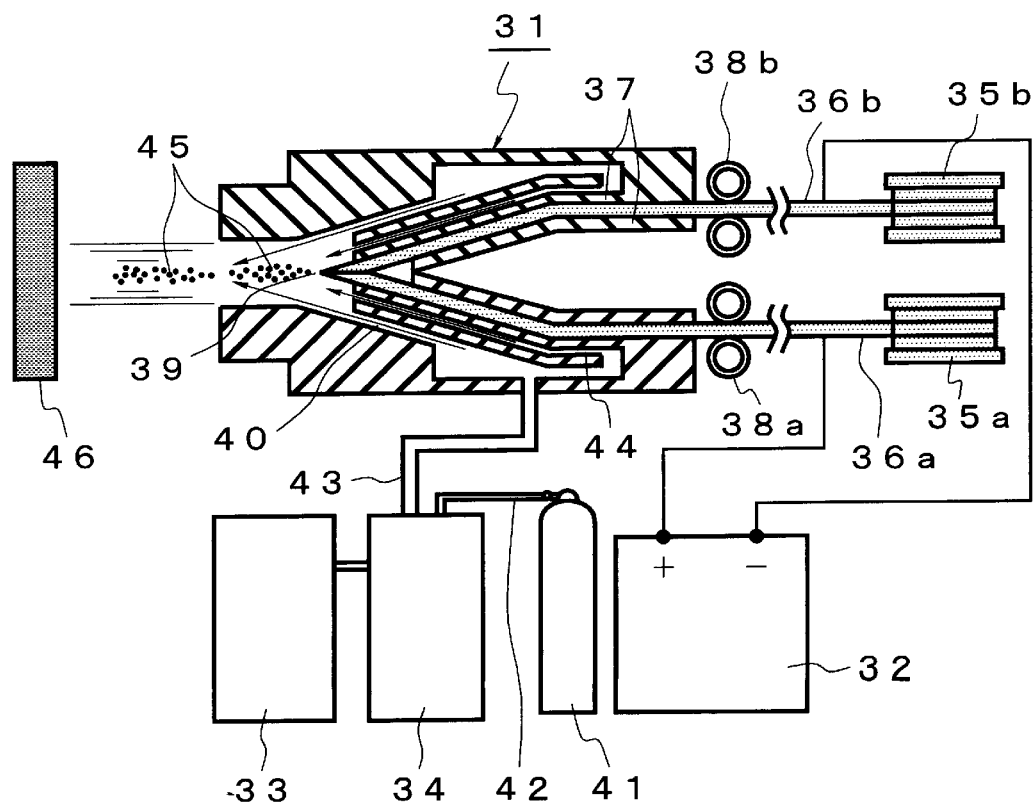
FIG. 29 is a view explaining a sprayer used to form a sprayed coating film of a metal nitride.

FIG. 29 shows a sprayer for spraying the metal nitride by a low-temperature spraying method. This sprayer comprises a high-frequency spray gun 31, a high-frequency direct current power supply 32, a compressor 33, a cooler 34 and a spray metal wire supply device having spools 35a, 35b. The spray gun 31 has two sets of feed rollers 38a, 38b for separately feeding spray metal wires 36a, 36b from the gun to a tip of a nozzle 37. When the spray metal wires 36a and 36b to which different polarities are imparted with the high-frequency direct current power supply 32 are contacted at a spray metal wire melting portion 39, an electrical arc is generated, and the spray metal wires 36a, 36b are melted with this electrical arc.

Meanwhile, a nitrogen-containing gas is fed from a container 41 filled with a nitrogen gas and an ammonia gas to a cooler 34 through a connecting pipe 42 to cool the same, and it is compressed with a compressor 33. The cooled nitrogen-containing compressed gas is introduced into the spray gun 31 through an introduction pipe 43, and fed in an arrow direction through a gap 40, reaching the spray metal wire melting portion 39. When the gas is passed through this portion as a high-speed stream, the pressure is reduced, and the metal melted in this melting portion 39 is pulverized. By the way, the cooled nitrogen-containing compressed gas introduced into the spray gun 31 is fed to the spray metal wire melting portion 39 also through a gap 44. The gap sectional areas are adjusted such that an amount of the compressed gas passed through the gap 40 is larger than that passed through the gap 44.

The pressure-reduced molten metal particles 45 in the spray wire melting portion 39 are contacted with the high-speed stream of the cooled nitrogen-containing compressed gas fed through the gap 40 and the cooled nitrogen-containing compressed gas fed through the gap 44 in the arrow direction, and the surfaces of the particles are nitrided to form nitrides. The nitrided molten metal particles 45 are flown toward a substrate 46 (substrate of a submerged structure on which a sprayed coating film is to be formed) along with the high-speed stream of the cooled nitrogen-containing compressed gas from the gap 40. The molten metal particles 45 are, when flown along with the high-speed stream, abruptly cooled to be in a supercooled state. Since the molten metal particles 45 in this supercooled state are in the molten state at a low temperature, these are struck against the surface of the substrate 46, and piled on that surface to form a sprayed coating film of the metal nitride.

As stated above, the molten metal particles are rendered in the supercooled state whereby oxidation of the surfaces of the molten metal particles is extremely suppressed and further the substrate of the resin or the like is not deformed when the metal particles being in the molten state at a low temperature are struck against the surface of the substrate to form the sprayed coating film. Further, the spray metal wire melting portion 39 at which the spray metal wires 36a, 36b are contacted and melted is put under reduced pressure and a high-frequency voltage is applied by a high-frequency direct current power source 32, making it possible to easily spray a metallic material having a high-melting point. By the way, the high frequency of the high-frequency voltage to be applied is preferably within the range of from 20 kHz to 200 kHz. When it is less than 20 kHz, the metallic material having a high-melting point cannot be melted at good efficiency at times. When it exceeds 200 kHz, the spray metal wires are melted and broken, and cannot continuously be sprayed at times.

The potential application conditions in the electrochemical control of organisms using the electrochemical stain prevention apparatus of the present invention are described. When a potential is applied to the conductive film formed on the stain prevention surface of the submerged structure, it is recommendable to periodically apply a positive potential and a negative potential.

First, application of a positive potential is described. Organisms in water can be adsorbed on the surface of the conductive film by applying a positive potential of from +0.1 V vs. SCE to +5.0 V vs. SCE to the conductive film of the submerged structure. Further, the positive potential to be applied to the conductive film has a function of electrochemically killing organisms adsorbed on the surface of the conductive film. When the applied potential is less than +0.1 V vs. SCE, organisms cannot be adsorbed on the conductive film and killed. Further, when a potential exceeding +5.0 V vs. SCE is applied, a thick oxide coating film having a high insulating property is, in some cases, formed on the surface of the conductive film or the conductive film is deteriorated. Thus, no desired effect is obtained. It is preferable that the application time of the positive potential is between 1 minute and 6 hours. When the application time exceeds 6 hours, other organisms are sometimes adsorbed on organisms killed on the surface of the conductive film of the submerged structure. Organisms adsorbed later are not directly contacted with the conductive film, and therefore do not undergo the electrochemical killing action by the positive potential.

Incidentally, when the positive potential of from +0.1 V vs. SCE to +5.0 V vs. SCE is applied to the conductive film (working electrode) in the stain prevention apparatus of the two-electrode system, it is advisable to apply the potential of from 0.3 V to 7.5 V to the counter electrode.

Aquatic organisms adhered to the conductive film were electrochemically controlled or killed so far mainly through the electron transfer reaction between cells and the conductive film by applying a relatively low potential of 1.5 V or less. On the other hand, in the present invention, since the conductive film is used which does not allow generation of harmful chlorine even by applying a relatively high potential of +5.0 V vs. SCE, it has been possible to apply the relatively high potential of +1.5 V vs. SCE or more to the conductive film. When such a high potential is applied, water is hydrolyzed to form an OH radical. The OH radical has quite a high oxidation activity and can destroy cell membranes of organisms adhered to the surface of the conductive film, influence DNA in cells and kill organisms. Accordingly, in the present invention, this OH radical can positively be utilized to electrochemically control or kill aquatic organisms. Since the OH radical generated this time has quite a short life, there is no pollution of sea water or fresh water.

Therefore, according to the present invention, when a potential in a wide range of from +0.1 V vs. SCE to +5.0 V vs. SCE is applied to the conductive film, it is possible to electrochemically control or kill aquatic organisms more effectively by both of the actions, the ordinary electron transfer reaction between cells and electrode by the application of the relatively low potential and the OH radical generated through electrolysis of water by the application of the relatively high potential. Meanwhile, when the potential in the relatively limited range of from +1.5 V vs. SCE to +5 V vs. SCE is applied to the conductive film, the control or the killing by the OH radical is preferentially carried out, rather than by the electron transfer reaction between cells and electrode. Therefore, it is possible to control or kill organisms for a short period of time using the OH radical having a strong oxidation activity.

After the application of the positive potential, the negative potential of from −0.1 V vs. SCE to −2.0 V vs. SCE is applied to the conductive film, making it possible to remove organisms adsorbed and killed on the surface of the conductive film. When the applied potential is higher than −0.1 V vs. SCE, organisms cannot be removed from the surface of the conductive film. When it is lower than −2.0 V vs. SCE, the pH is increased, and it is therefore undesirable. The time for applying the negative potential is preferably between 1 minute and 2 hours. When the application time exceeds 2 hours, it is impossible to effectively kill organisms.

Incidentally, when the negative potential of from −0.1 V vs. SCE to −2.0 V vs. SCE is applied to the conductive film (working electrode) in the stain prevention apparatus of the two-electrode system, it is advisable to apply a voltage of from 0.3 to 7.5 V to the counter electrode.

The present invention is specifically illustrated by referring to the following Examples.

Formation of a Conductive Film of a Submerged Structure

EXAMPLE 1

A surface of a polyethylene terephthalate (PET) resin plate (30×50×5 mm) was dipped in an aqueous solution of 60° C. containing 200 g/L (liter) of chromic acid and 550 g/L of sulfuric acid for 60 minutes to conduct etching. Subsequently, 100 g of a polyester-based adhesive ("PES-360SSK" made by Toagosei Co., Ltd.) and 10 g of an isocyanate-based curing agent ("Coronate L" made by Nippon Polyurethane Industry Co., Ltd.) were mixed. Two-hundred percent by weight, based on the resin solid content of the resulting mixture, of an alumina powder having a mean particle size of 70 $\mu$m (made by Japan Abrasive Co., Ltd.) were added, and 150 g of a mixed solvent (toluene: MEK=8:2) were added. The mixture was stirred well. The resin composition thus obtained was coated on the surface of the etched PET resin by a spraying method, and dried at 90° C. for 60 minutes. Then, titanium was sprayed under the following conditions using the sprayer ("PC250iDEX" supplied by Arctechno Co., Ltd.) shown in FIG. 29. As titanium, a pure titanium wire having a diameter of 1.3 mm was used. A high-frequency voltage was applied at 40 kHz and 14 V. Air cooled to 11° C. was introduced into a spray gun at a pressure of 8 kg/cm$^2$ and a titanium wire was fed at a feed rate of 5.2 m/min to form a sprayed coating film of titanium nitride having a thickness of 200 $\mu$m on the PET resin. The resulting sprayed coating film had a light yellow color.

EXAMPLE 2

A surface of a cement plate (30×50×5 cm) was roughened by blast treatment, and then titanium was sprayed under the same conditions as in Example 1 using the sprayer used in Example 1 to form a sprayed coating film of titanium nitride having a thickness of 200 $\mu$m on the cement plate. While the spraying was conducted using cooled air in Example 1, it was conducted under the same condition of the gas pressure as in Example 1 by replacing cooled air with a nitrogen gas. The resulting sprayed coating film had a light yellow color.

EXAMPLE 3

A surface of a stainless steel plate (30×50×1 mm) was roughened by sand blast treatment. Alumina was then sprayed on the stainless steel in a nitrogen gas (flow rate: 100 L/min) by an ordinary plasma jet spraying method to form an alumina sprayed coating film having a thickness of 100 $\mu$m. Subsequently, titanium was sprayed using the same sprayer as in Example 2 under the same conditions to form a sprayed coating film of titanium nitride having a thickness of 200 $\mu$m on the alumina coating film. The resulting sprayed coating film had a light yellow color.

EXAMPLE 4

A surface of an FRP plate (30×50×10 mm) was roughened by sand blast treatment. Subsequently, 100 g of a silicon-acrylic resin ("Beltight 6000" made by Nippon Oil & Fats Corp.) and 200% by weight, based on the solid content of the silicon-acrylic resin, of an alumina powder having a mean particle size of 70 $\mu$m (made by Japan Abrasive Co., Ltd.) were mixed. The mixture was stirred well. To the resulting resin composition were added an exclusive curing agent and an exclusive thinner. The resulting mixture was coated on the surface of the etched FRP resin by a spraying method, and dried at 100° C. for 60 minutes. Subsequently, a sprayed coating film of titanium nitride having a thickness of 150 $\mu$m was formed under the same conditions as in Example 1 except that a mixed gas of a nitrogen gas and an ammonia gas (nitrogen gas:ammonia gas=10:1 in volume ratio) was introduced to a spray gun at 8 kg/cm$^2$. The resulting sprayed coating film had a light yellow color.

EXAMPLE 5

A sprayed coating film of titanium nitride having a thickness of 200 $\mu$m was formed on a surface of an FRP plate (30×50×10 mm) under the same conditions as in Example 4 except that the mixed gas of the nitrogen gas and the ammonia gas used in Example 4 was replaced with a mixed gas of air and an ammonia gas (air:ammonia gas=5:1 in volume ratio). The resulting sprayed coating film had a light yellow color.

EXAMPLE 6

A surface of an FRP plate (30×50×5 mm) was roughened using an emery paper (#100). To 100 parts by weight of a polyester-based adhesive ("PES-360SSK") were added 5 parts by weight of an isocyanate-based curing agent ("Coronate L") and 100 parts by weight of a solvent (toluene:MEK=8:2), and the mixture was stirred and mixed well. This adhesive was coated on the roughened FRP surface by a spraying method, and then dried at 80° C. for 10 minutes. Subsequently, a fabric ("H201M104F" made by Unitika Glass Fiber Co., Ltd.) obtained by weaving glass fibers was placed on the FRP coated with the adhesive, and heat-pressed at 200° C. and a pressure of 10 kg/cm$^2$ for 2 minutes. Then, a sprayed coating film of titanium nitride having a thickness of 200 μm was formed on the glass fiber fabric under the same conditions as in Example 1 using the sprayer used in Example 1.

EXAMPLE 7

The adhesive used in Example 1 was coated on a surface of a nylon plate (30×50×5 mm) under the same conditions as in Example 6. Subsequently, a fabric ("KE3033" made by Du Pont-Toray-Kevlar Co., Ltd.) obtained by weaving polyaramid-based fibers was heat-pressed on the nylon plate having the adhesive coated thereon under the same conditions as in Example 6. Then, titanium was sprayed onto the polyaramid-based fiber fabric using the sprayer used in Example 1. While the spraying was conducted under the condition of the air pressure of 8 kg/cm$^2$ in Example 6, the conditions were the same as in Example 1 except that air was replaced with a nitrogen gas and the gas pressure was 15 kg/cm$^2$. As a result, a sprayed coating film of titanium nitride having a thickness of 200 μm was formed on the polyaramid-based fiber fabric.

EXAMPLE 8

A surface of a stainless steel plate (30×50×1 mm) was roughed by sand blast treatment. Subsequently, alumina was sprayed on the stainless steel plate in a nitrogen gas (flow rate: 100 L/min) by an ordinary plasma jet spraying method to form an alumina sprayed coating film having a thickness of 100 μm. A two component curable epoxy-based adhesive ("Bond Quick" made by Konishi Co., Ltd.) was coated on the alumina sprayed coating film, and a fabric ("C0641" made by Toray Industries, Inc.) obtained by weaving carbon fibers was then laminated. Thereafter, titanium was sprayed under the same conditions as in Example 7 using the sprayer used in Example 1 to form a sprayed coating film having a thickness of 200 μm on the carbon fiber fabric.

COMPARATIVE EXAMPLE 1

After the surface of the FRP plate used in Example 6 was roughened with an emery paper (#100), titanium was sprayed under the same conditions as in Example 1 using the sprayer used in Example 1. A titanium nitride coating film was little formed on the FRP surface.

COMPARATIVE EXAMPLE 2

After the surface of the nylon plate used in Example 2 was roughened by sand blast treatment, titanium was sprayed under the same conditions as in Example 1 using the sprayer used in Example 1. A titanium nitride coating film was not formed on the surface of the nylon plate, and the nylon plate was deformed.

Analysis of Sprayed Coating Films

The sprayed coating films obtained in Examples 1 to 8 were analyzed by the X-ray diffraction method. The X-ray diffraction was conducted at an angle of incidence of 0.2° by a thin film method using CuK α as an X-ray. As a result, a diffraction peak ascribable to TiN was observed in the sprayed coating films obtained in Examples 1 to 8, and it was identified that the titanium nitride coating film was formed by the method of the present invention.

Evaluation of a Durability of Sprayed Coating Films

Figure 30:
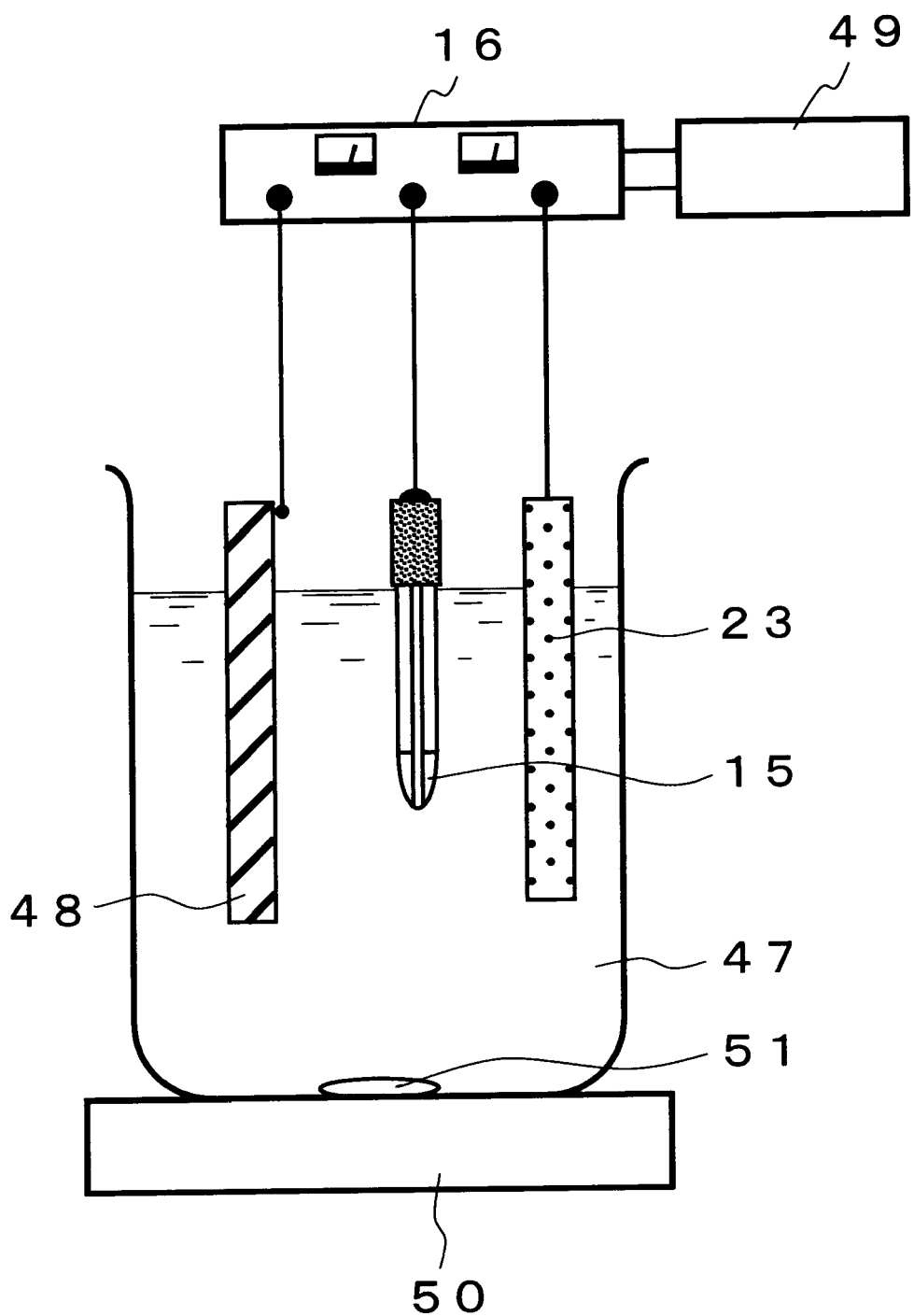
FIG. 30 is a view explaining a device used in a test for evaluation of durability of a sprayed coating film.

A member having the titanium nitride sprayed coating film obtained in each of Examples 1 to 8 was used as a working electrode, and its durability was evaluated. A test device shown in FIG. 30 was used in the test for evaluation of the durability. The working electrode formed of the member 48 having the titanium nitride sprayed coating film obtained in each of Examples 1 to 8, a counter electrode 23 formed of a platinum plate and a reference electrode 15 formed of a saturated calomel electrode (SCE) are arranged in a test tank 47 filled with 500 mL of sea water, and each of the electrodes is electrically connected with a potentiostat 16. Further, the potentiostat 16 is electrically connected with a function generator 49. A stirring device 50 and a stirrer 51 are disposed on the bottom of the test tank 47.

A fixed potential of 1.0 V vs. SCE was continuously applied to the working electrode of the test device of such a structure for 3 days. An amount of a metal eluted from the surface of the sprayed coating film of the working electrode formed of the member 48 was measured by ICP spectroscopy, and a resistance value of the sprayed coating film on the member 48 was measured using a multimeter ("73 Multimeter" supplied by John Fluke Mfg. Co., Inc.). The test results are shown in Table 1.

TABLE 1

| Type of member | Metal eluted from sprayed coating film (ppm) | Change in resistance value |
| --- | --- | --- |
| Example 1 | below the limit of detection | no change |
| Example 2 | below the limit of detection | no change |
| Example 3 | below the limit of detection | no change |
| Example 4 | below the limit of detection | no change |
| Example 5 | below the limit of detection | no change |
| Example 6 | below the limit of detection | no change |
| Example 7 | below the limit of detection | no change |
| Example 8 | below the limit of detection | no change |

Identification of a Killing Effect

EXAMPLE 9

Marine bacteria *Vibrio alginolyticus* were used as aquatic organisms. The marine bacteria were aerobically incubated in a synthetic medium ("Marine broth 2216" made by DIFCO Laboratory Co., Ltd.) at 25° C. for 10 hours. After the incubation, the cells were centrifugally collected, then washed with sterile sea water, and suspended in sterile sea water. The number of cells was counted using a hematite meter. A cell suspension having a concentration of $1\times10^8$ cells/mL was prepared, and used in the test. The member obtained in each of Examples 1 to 8 was dipped in the cell suspension having the concentration of $1\times10^8$ cells/mL for 90 minutes, and the marine bacteria were adsorbed on the surface of the conductive film of the member. Subsequently, the thus obtained member having the marine bacteria adsorbed thereon was mounted as the working electrode in the test tank 47 filled with sterile sea water in the device shown in FIG. 30, and a fixed voltage of 1.0 V vs. SCE was applied for 30 minutes. Incidentally, in the evaluation, the marine bacteria adsorbed on the surface of the conductive film of the member were recovered by pipetting, the number of viable cells was measured by a colony counting method, and a ratio of viable cells was calculated using the following formula.

Ratio of viable cells =

$$\frac{\text{(number of viable cells after potential application}}{\text{number of viable cells before potential application)}} \times 100$$

The results are shown in Table 2.

TABLE 2

| Type of member | Ratio of viable cells (%) |
|---|---|
| Example 1 | 0 |
| Example 2 | 0 |
| Example 3 | 0 |
| Example 4 | 0 |
| Example 5 | 0 |
| Example 6 | 0 |
| Example 7 | 0 |
| Example 8 | 0 |

EXAMPLE 10

An FRP plate (5 cm×2 cm, 1 cm in thickness) was used in the substrate 1 of the submerged structure 3 of the stain prevention apparatus of the two-electrode system shown in FIG. 1, and a titanium foil as the conductive film 2 was laminated through an adhesive by the following method. The surface of the FRP plate substrate was roughened with an emery paper (#100). Then, 100 parts by weight of a polyester-based adhesive ("PES-360SSK") were mixed with 5 parts by weight of an isocyanate-based curing agent ("Coronate L"), and 150 parts by weight of a solvent (xylene:MEK=1:1) were added. The mixture was coated on the roughened surface of the FRP plate by a spraying method, and dried at 100° C. for 5 minutes. Subsequently, a titanium foil of 50 μm was put on the FRP plate having the adhesive coated thereon, and heat-pressed at 200° C. and a pressure of 20 kg/cm$^2$ for 5 minutes. A titanium plate (5 cm×2 cm, 2 mm in thickness) was used as a counter electrode, and a direct current power supply was used as a power supply.

Marine bacteria *Vibrio alginolyticus* were adhered to the titanium foil of the working electrode made of the FRP plate having the titanium foil laminated thereon. A voltage of +1.8 V was applied to the working electrode in sterile sea water for 30 minutes, and the ratio of viable cells of the marine bacteria on the titanium foil was then measured by the method used in Example 9. As a result, when the ratio of viable cells before applying the potential was rated as 100%, the ratio of viable cells after applying the potential was 0%. Further, the potential of the titanium foil of the working electrode to which the voltage of 1.8 V was applied and the potential of the titanium plate of the counter electrode were measured with an electrometer using a silver/silver chloride electrode as a reference electrode. Consequently, a potential of 1.2 V vs. Ag/AgCl was applied to the titanium foil, and a potential of −0.6 V vs. Ag/AgCl was applied to the titanium plate of the counter electrode.

Subsequently, marine bacteria *Vibrio alginolyticus* were adhered to the surface of the titanium plate as the counter electrode. A voltage of −1.8 V was applied to the working electrode in sterile sea water for 30 minutes, and the ratio of viable cells of the marine bacteria on the titanium plate as the counter electrode was measured by the method used in Example 9. As a result, when the ratio of viable cells before applying the potential was rated as 100%, the ratio of viable cells after applying the potential was 0%. Further, the potential of the titanium plate as the counter electrode when the voltage of −1.8 V was applied to the working electrode and the potential of the titanium foil as the working electrode were measured with an electrometer using a silver/silver chloride electrode as a reference electrode. Consequently, a potential of 1.2 V vs. Ag/AgCl was applied to the titanium plate as the counter electrode, and a potential of −0.6 V vs. Ag/AgCl was applied to the titanium foil as the working electrode.

From the above-mentioned results, it could be identified that the marine bacteria adhered to the working electrode and the counter electrode could be killed by applying the voltage from the direct current power supply upon changing the polarity.

EXAMPLE 11

An FRP plate (5 cm×2 cm, 1 cm in thickness) was used in the substrate 1 of the submerged structure 3 of the stain prevention apparatus of the three-electrode system shown in FIG. 6, and a titanium foil as the conductive film 2 was laminated on the FRP plate through an adhesive in the same manner as in Example 10. A silver/silver chloride electrode was used as the reference electrode, a titanium plate (5 cm×2 cm, 2 mm in thickness) as the counter electrode, and a potentiostat as the direct current power source respectively.

Marine bacteria *Vibrio alginolyticus* were adhered to the titanium foil of the working electrode made of the FRP plate having the titanium foil laminated thereon. A positive potential of 1.0 V vs. Ag/AgCl was applied to the working electrode with a potentiostat in sterile sea water for 30 minutes, and a ratio of viable cells of the marine bacteria on the titanium foil was then measured by the method used in Example 9. As a result, when the ratio of viable cells before applying the potential was rated as 100%, the ratio of viable cells after applying the potential was 2%.

Further, a negative potential was applied to the working electrode, and the removal of the marine bacteria adhered to the titanium foil was carried out. The marine bacteria *Vibrio alginolyticus* were adhered to the titanium foil of the working electrode, and a negative potential of −0.6 V vs. Ag/AgCl was applied to the working electrode with a potentiostat in sterile sea water for 10 minutes. Then, a ratio of viable cells of the marine bacteria on the titanium foil was measured by the method used in Example 9. Consequently, when the ratio of viable cells before applying the negative potential was rated as 100%, the ratio of viable cells after applying the negative potential was 45%. The marine bacteria adhered to the titanium foil were removed by applying the negative potential.

From the above-mentioned results, it could be identified that the marine bacteria adhered to the working electrode were killed by applying the positive potential and removed by applying the negative potential.

EXAMPLE 12

An FRP plate (5 cm×2 cm, 1 cm in thickness) was used in the substrate 1 of the submerged structure 3 of the stain prevention apparatus shown in Table 2. A titanium foil having titanium nitride formed on the surface thereof as the conductive film 2 was laminated on the FRP plate through an adhesive in the same manner as in Example 10. The conductive film laminated on the FRP plate was divided into two parts by providing a gap of 1 mm near the center thereof, and thus completely insulated. Incidentally, the titanium foil having titanium nitride formed on the surface thereof was made by treating the titanium foil in a nitrogen atmosphere at 1,000° C. for 1 hour.

Marine bacteria *Vibrio alginolyticus* were adhered to the conductive film, and a voltage of +1.8 V was applied in sterile sea water for 30 minutes using a direct current power supply. Then, the marine bacteria on each of the two divided conductive films were measured by the method used in Example 9. As a result, when a ratio of viable cells before applying the potential was rated as 100%, a ratio of viable cells on one conductive film was 0% after applying the potential. Further, a ratio of viable cells on another conductive film was 40% after applying the potential.

Moreover, the potential of the conductive film to which a voltage of 1.8 V was applied was measured with an electrometer using a silver/silver chloride electrode as a reference electrode. As a result, the potential of 1.2 V vs. Ag/AgCl was applied to one of the two divided conductive films, and the potential of −0.6 V vs. Ag/AgCl to another conductive film.

From the above-mentioned results, it was identified that when the conductive film divided into two parts through the insulating portion was laminated on the surface of the submerged structure and the voltage was applied to this conductive film with the direct current power supply, organisms on one of the two divided conductive films were killed and organisms on another conductive film were removed. That is, organisms on the two divided conductive films can be killed or removed by applying the potential upon periodically changing the polarity. Incidentally, in the apparatus of this Example, the counter electrode becomes unnecessary.

EXAMPLE 13

Titanium was used in the substrate 1 of the submerged structure 1 of the stain prevention apparatus of the three-electrode system shown in FIG. 6. Titanium nitride was formed as the conductive film 2 on the substrate by sputtering to form a working electrode. A mesh obtained by coating a titanium substrate with platinum was used as a counter electrode. A silver/silver chloride electrode was used as a reference electrode, and a potentiostat was used as a power supply.

Marine bacteria *Vibrio alginolyticus* were adhered to the conductive film made of titanium nitride of the working electrode, and potentials of 0.8 V and 2 V vs. Ag/AgCl were applied in sterile sea water for 5 minutes. Then, a ratio of viable cells of the marine bacteria on the conductive film was measured by the method used in Example 9. As a result, when a ratio of viable cells before applying the potential was rated as 100%, a ratio of viable cells after applying the potential of 0.8 V vs. Ag/AgCl was 63%, and a ratio of viable cells after applying the potential of 2.0 V vs. Ag/AgCl was 0%.

Further, in each applied potential, the generation of chlorine was examined with a residual chloride electrode, and the generation of OH radical with ESR. Consequently, chlorine was below the limit of detection in both 0.8 V and 2.0 V vs. Ag/AgCl. Moreover, the OH radical was not generated in 0.8 V vs. Ag/AgCl, but was generated in 2.0 V vs. Ag/AgCl.

From these results, it was shown that marine bacteria could effectively be killed at a relatively low potential by using titanium nitride as the conductive film, and further that marine bacteria could completely be killed by generating the OH radical.

EXAMPLE 14

A ratio of viable cells of marine bacteria on the conductive film made of titanium nitride in the working electrode was measured as in Example 13 except that a counter electrode obtained by forming titanium nitride on a titanium substrate through sputtering was used in Example 13. As a result, when a ratio of viable cells before applying the potential was rated as 100%, a ratio of viable cells after applying the potential of 0.8 V vs. Ag/AgCl was 68%, and a ratio of viable cells after applying the potential of 2.0 V vs. Ag/AgCl was 0%.

Further, in each applied potential, the generation of chlorine was examined with a residual chloride electrode, and the generation of OH radical with ESR. Consequently, chlorine was below the limit of detection in both 0.8 V and 2.0 V vs. Ag/AgCl. Moreover, the OH radical was not generated in 0.8 V vs. Ag/AgCl, but was generated in 2.0 V vs. Ag/AgCl.

From these results, it was shown that marine bacteria could effectively be killed at a relatively low potential by using titanium nitride in the conductive film of the working electrode even when the counter electrode was used in which titanium nitride was formed on the titanium substrate through sputtering in example 13, and further that marine bacteria could completely be killed by generating the OH radical.

What is claimed is:

1. An electrochemical stain prevention apparatus for a submerged structure, comprising: a submerged structure having formed thereon a stain prevention surface formed of a conductive film comprised of a metal or its compound that does not generate chlorine even upon application of a potential of 5 V vs. SCE or less thereto; a counter electrode located so as not to come into contact with the submerged structure; and a power supply unit for passing a direct current through the submerged structure having the conductive film formed thereon and the counter electrode.

2. The electrochemical stain prevention apparatus for the submerged structure as claimed in claim 1; further comprising a conductive film that does not generate chlorine even upon application of a potential of 5 V vs. SCE or less thereto formed on a surface of the counter electrode.

3. The electrochemical stain prevention apparatus for the submerged structure as claimed in any one of claims 1 and 2; wherein the power supply unit includes means for applying a direct current voltage to the submerged structure and the counter electrode while periodically changing the polarity of the direct current voltage.

4. The electrochemical stain prevention apparatus for the submerged structure as claimed in claim 1; wherein the metal is a valve metal.

5. The electrochemical stain prevention apparatus for the submerged structure as claimed in claim 1; wherein the metal compound is one or more types selected from the group consisting of a metal nitride, a metal carbide, a metal boride and a metal silicide.

6. The electrochemical stain prevention apparatus for the submerged structure as claimed in claim 1; wherein the conductive film comprises a sprayed coating film formed of metal nitride.

7. The electrochemical stain prevention apparatus for the submerged structure as claimed in claim 6; wherein the conductive film comprising a sprayed coating film formed of metal nitride is formed by a process comprising the steps of forming a metal wire into molten metal particles, contacting the molten metal particles with a cooled nitrogen-containing gas to nitride the surfaces of the molten metal particles and to render the molten metal particles in a supercooled state, and laminating the molten metal particles in the supercooled state on the substrate of the submerged structure to form a sprayed coating film.

8. The electrochemical stain prevention apparatus for the submerged structure as claimed in claim 7; wherein the process of forming the conductive film further comprises the steps of laminating a fiber layer on the substrate of the submerged structure through an adhesive layer, and forming the sprayed coating film thereafter on the fiber layer.

9. The electrochemical stain prevention apparatus for the submerged structure as claimed in claim 7; wherein the substrate of the submerged structure is formed of a resin material; and further comprising the steps of roughening the surface of the resin material physically and/or chemically, forming a resin layer containing an inorganic powder having a particle diameter from 10 to 200 $\mu$m on the roughened surface, and forming the sprayed coating film on the resin layer.

10. The electrochemical stain prevention apparatus for the submerged structure as claimed in claim 7; wherein the substrate of the submerged structure is formed of a metallic material; and further comprising the steps of forming an insulating layer on the surface of the metallic material through or not through a first adhesive layer, forming a resin layer containing an inorganic powder having a particle diameter of from 10 to 200 $\mu$m on the insulating layer through or not through a second adhesive layer, and forming the sprayed coating film on the resin layer.

11. An electrochemical stain prevention apparatus for a submerged structure, comprising: a submerged structure having formed thereon a stain prevention surface formed of a conductive film comprised of a metal or its compound that does not generate chlorine even upon application of a potential of 5 V vs. SCE or less, the conductive film being divided into at least two portions with an insulating portion formed therebetween; and a power supply unit for passing a direct current through each of the divided portions of the conductive film.

12. The electrochemical stain prevention apparatus for the submerged structure as claimed in claim 11; wherein the power supply unit includes means for applying a direct current voltage to each of the divided portions of the conductive film while periodically changing the polarity of the direct current voltage.

13. An electrochemical stain prevention apparatus for submerged structures, comprising: a submerged structure assembly in which a plurality of submerged structures are connected through an insulating portion, each of the submerged structures having formed thereon a stain prevention surface formed of a conductive film comprised of a metal or its compound that does not generate chlorine even upon application of a potential of 5 V vs. SCE or less; and a power supply unit for passing a direct current through each of the conductive films of the submerged structures connected through the insulating portion.

14. The electrochemical stain prevention apparatus for submerged structures as claimed in claim 13; wherein the power supply unit includes means for applying a direct current voltage to each of the conductive films of the submerged structures while periodically changing the polarity of the direct current voltage.

15. An electrochemical stain prevention apparatus for a submerged structure, comprising: a submerged structure having formed thereon a stain prevention surface formed of a conductive film comprised of a metal or its compound that does not generate chlorine even upon application of a potential of 5 V vs. SCE or less thereto; a counter electrode located so as not to come into contact with the submerged structure; a power supply unit for passing a direct current through the submerged structure having the conductive film formed thereon and the counter electrode; and a reference electrode mounted between the submerged structure and the counter electrode for controlling a potential applied to the conductive film formed on the surface of the submerged structure.

16. The electrochemical stain prevention apparatus for the submerged structure as claimed in claim 15; further comprising a conductive film that does not generate chlorine even upon application of a potential of 5 V vs. SCE or less thereto formed on a surface of the counter electrode.

17. The electrochemical stain prevention apparatus for the submerged structure as claimed in any one of claims 15 and 16; wherein the power supply unit includes means for applying a direct current voltage to the conductive film of the submerged structure such that a positive potential and a negative potential are alternately applied.

18. The electrochemical stain prevention apparatus for the submerged structure as claimed in any one of claims 15 and 16; wherein the power supply unit has a potential control portion electrically connected with a working electrode formed of the conductive film of the submerged structure, the counter electrode and the reference electrode, and a data processing portion for controlling the potential control portion; wherein in the potential control portion the potential set by the data processing portion is applied to the working electrode and the counter electrode, the potentials of the reference electrode and the working electrode are measured to give the measured values to the data processing portion; and wherein in the data processing portion, the potential measured values supplied by the potential control portion are analyzed to adjust the indication of the potential control to the potential control portion.

19. The electrochemical stain prevention apparatus for the submerged structure as claimed in claim 18; wherein the data processing portion and the potential control portion are connected through a communication line.

20. The electrochemical stain prevention apparatus for the submerged structure as claimed in claim 18; wherein a plurality of the potential control portions are provided, and the data processing portion is electrically connected with each of the plural potential control portions.

21. The electrochemical stain prevention apparatus for the submerged structure as claimed in claim 18; wherein a plurality of reference electrodes are electrically connected with the potential control portion, and one of the average value of the measured values of the potentials of the plural reference electrodes and one of the measured values of the potentials of the plural reference electrodes is supplied to the data processing portion as a standard value of the potentials of the plural reference electrodes.

22. The electrochemical stain prevention apparatus for the submerged structure as claimed in claim 18; further comprising a temperature sensor and a pH sensor electrically connected with the potential control portion, measured values of the temperature sensor and pH sensor are supplied to the data processing portion, and the indication of the control of the potential from the data processing portion to the potential control portion is corrected by the measured temperature and pH values.

23. A method for electrochemically controlling organisms using the stain prevention apparatus as claimed in any one of claims 1, 2, 15 and 16; comprising the steps of applying a potential of from 0.1 to 5 V vs. SCE to the submerged structure having the conductive film formed thereon, and electrochemically killing or controlling organisms by causing a direct electron transfer reaction of organisms adhered to the surface of the conductive film and/or by an OH radical generated through hydrolysis of water.

24. The method for electrochemically controlling organisms as claimed in claim 23; wherein a potential from 1.5 to 5 V vs. SCE is applied to the submerged structure having the conductive film formed thereon, and organisms adhered to the surface of the conductive film are electrochemically killed or controlled by the OH radical generated through electrolysis of water.

25. An electrochemical stain prevention apparatus for a submerged structure, comprising: a stain prevention surface formed on a water-contacting surface of the submerged structure, the stain prevention surface comprising a conductive film formed substantially of a metal or a compound thereof that does not promote the generation of chlorine in water even upon application of a potential of 5 V vs. SCE thereto; a counter electrode located so as not to come into contact with the submerged structure; and a power supply unit for passing a direct current through the conductive film and the counter electrode.

26. An electrochemical stain prevention apparatus according to claim 25; further comprising a conductive film that does not promote the generation of chlorine in water even upon application of a potential of 5 V vs. SCE thereto formed on a surface of the counter electrode.

27. An electrochemical stain prevention apparatus according to claim 25; wherein the power supply unit comprises a power supply unit for applying a direct current voltage to the submerged structure and the counter electrode while periodically changing the polarity of the direct current voltage.

28. An electrochemical stain prevention apparatus according to claim 25; wherein the conductive film is divided into at least two portions with an insulating portion formed therebetween, one portion of the divided conductive film serving as the counter electrode.

29. An electrochemical stain prevention apparatus according to claim 25; wherein the submerged structure comprises an assembly in which a plurality of submerged structures are connected through an insulating portion, each of the submerged structures having the conductive film formed thereon.

30. An electrochemical stain prevention apparatus according to claim 25; further comprising a reference electrode mounted between the submerged structure and the counter electrode for controlling a potential applied to the conductive film.

31. An electrochemical stain prevention apparatus according to claim 30; further comprising a conductive film that does not promote the generation of chlorine even upon application of a potential of 5 V vs. SCE or less thereto formed on a surface of the counter electrode.

32. An electrochemical stain prevention apparatus according to claim 25; wherein the power supply unit includes means for applying a direct current voltage to the conductive film of the submerged structure such that a positive potential and a negative potential are alternately applied.

33. An electrochemical stain prevention apparatus according to claim 25; wherein the metal is a valve metal.

34. An electrochemical stain prevention apparatus according to claim 25; wherein the metal compound comprises one or more compounds selected from the group consisting of metal nitrides, metal carbides, metal borides and metal silicides.

35. An electrochemical stain prevention apparatus according to claim 25; wherein the conductive film comprises a sprayed coating film formed of metal nitride.

36. A process for producing the submerged structure having the conductive film formed of the sprayed coating film formed of metal nitride according to claim 25; comprising the steps of forming a metal wire into molten metal particles, contacting the molten metal particles with a cooled nitrogen-containing gas to nitride the surfaces of the molten metal particles and to render the molten metal particles in a supercooled state, and laminating the molten metal particles in the supercooled state on the substrate of the submerged structure to form a sprayed coating film.

37. A process for producing the submerged structure according to claim 36; further comprising the steps of laminating a fiber layer on the substrate of the submerged structure through an adhesive layer, and forming the sprayed coating film on the fiber layer.

38. A process for producing the submerged structure according to claim 36; wherein the substrate of the submerged structure is formed of a resin material; and further comprising the steps of roughening the surface of the resin material physically and/or chemically, forming a resin layer containing an inorganic powder having a particle diameter from 10 to 200 μm on the roughened surface, and forming the sprayed coating film on the resin layer.

39. A process for producing the submerged structure according to claim 36; wherein the substrate of the submerged structure is formed of a metallic material; and further comprising the steps of forming an insulating layer on the surface of the metallic material, forming a resin layer containing an inorganic powder having a particle diameter of from 10 to 200 μm on the insulating layer, and forming the sprayed coating film on the resin layer.

* * * * *